(12) United States Patent
Takahashi et al.

(10) Patent No.: US 6,760,169 B2
(45) Date of Patent: Jul. 6, 2004

(54) PRISM OPTICAL ELEMENT, IMAGE OBSERVATION APPARATUS AND IMAGE DISPLAY APPARATUS

(75) Inventors: Junko Takahashi, Atsugi (JP); Koichi Takahashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/038,584

(22) Filed: Jan. 8, 2002

(65) Prior Publication Data

US 2002/0105737 A1 Aug. 8, 2002

Related U.S. Application Data

(60) Continuation of application No. 09/570,652, filed on May 12, 2000, now abandoned, which is a division of application No. 08/867,779, filed on Jun. 3, 1997, now abandoned.

(30) Foreign Application Priority Data

May 7, 1997 (JP) .............................................. 9-116724
May 7, 1997 (JP) .............................................. 9-116725

(51) Int. Cl.[7] ............................ G02B 5/04; G02B 27/14
(52) U.S. Cl. ...................... 359/834; 359/631; 359/633; 359/637
(58) Field of Search ................................ 359/637, 629, 359/630, 631, 632, 633, 833, 834; 345/7, 8

(56) References Cited

U.S. PATENT DOCUMENTS

| | | | |
|---|---|---|---|
| RE27,356 E | 5/1972 | La Russa | |
| 4,026,641 A | 5/1977 | Bosserman et al. | |
| 4,322,135 A | 3/1982 | Freeman | |
| 4,669,810 A | 6/1987 | Wood | |
| 4,969,724 A | 11/1990 | Ellis | |
| 5,689,736 A | 11/1997 | Okuyama et al. | |
| 5,699,194 A | 12/1997 | Takahashi | |
| 5,701,202 A | 12/1997 | Takahashi | |
| 5,706,136 A | 1/1998 | Okuyama et al. | |
| 5,745,295 A | 4/1998 | Takahashi | |
| 5,768,025 A | 6/1998 | Togino | |
| 5,774,268 A | * 6/1998 | Takahashi | 359/631 |
| 5,790,311 A | 8/1998 | Togino | |
| 5,790,312 A | 8/1998 | Togino | |
| 5,818,641 A | 10/1998 | Takahashi | |
| 5,909,317 A | * 6/1999 | Nakaoka et al. | 359/633 |
| 5,909,325 A | 6/1999 | Kuba et al. | |
| 5,917,656 A | * 6/1999 | Hayakawa et al. | 359/631 |
| 5,986,812 A | * 11/1999 | Takahashi | 359/633 |
| 6,034,823 A | 3/2000 | Togino | |

FOREIGN PATENT DOCUMENTS

| | | |
|---|---|---|
| EP | 583116 A2 | 2/1994 |
| EP | 687932 A2 | 12/1995 |
| EP | 730183 A2 | 9/1996 |
| JP | 62-214782 | 9/1987 |
| JP | 3-101709 | 4/1991 |
| JP | 7-333551 | 12/1995 |
| JP | 8-234137 | 9/1996 |

* cited by examiner

Primary Examiner—Ricky D. Shafer
(74) Attorney, Agent, or Firm—Pillsbury Winthrop LLP

(57) ABSTRACT

An extremely compact prism optical element, image observation apparatus and image display apparatus which are capable of providing an observation image that is clear and has minimal aberration and minimal distortion even at a wide field angle. Light rays emitted from an image display device (7) enter an ocular optical system (12) through a fourth surface (6) and are totally reflected toward an observer's pupil (1) by a third surface (5). The reflected light rays are reflected by a first surface (3) disposed immediately in front of the observer's pupil (1) and then reflected toward the observer's pupil (1) by a second surface (4). The reflected light rays pass through the first surface (3) and are projected into an observer's eyeball (15) with the observer's iris position as an exit pupil (1). When an external-scene image is observed, light rays from an object point in the external scene enter the ocular optical system (12) through the third surface (5), pass through the first surface (3) and are projected into the observer's eyeball (15). Assuming that the angle of internal reflection of an arbitrary light ray at the third surface (5) is $\theta_{r3}$, the ocular optical system (12) satisfies the condition of $\sin^{-1}(1/n_d) \leq \theta_{r3} \leq 60°$, where $n_d$ is the refractive index for the spectral d-line of the medium of the ocular optical system (12).

18 Claims, 16 Drawing Sheets

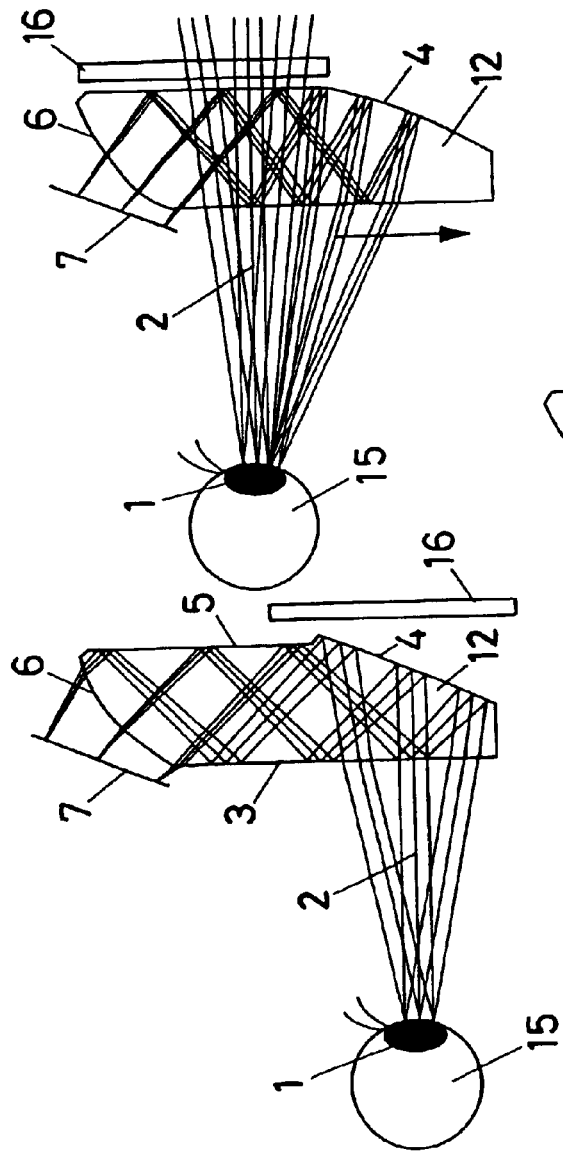
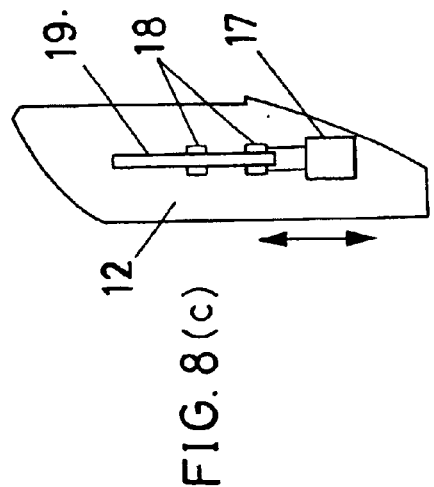
FIG. 8(b)
FIG. 8(a)
FIG. 8(c)

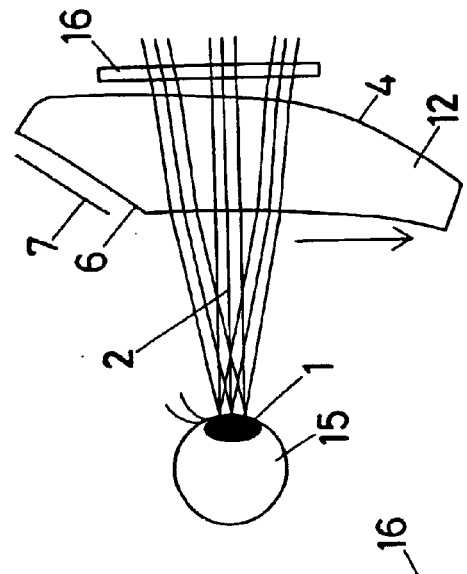
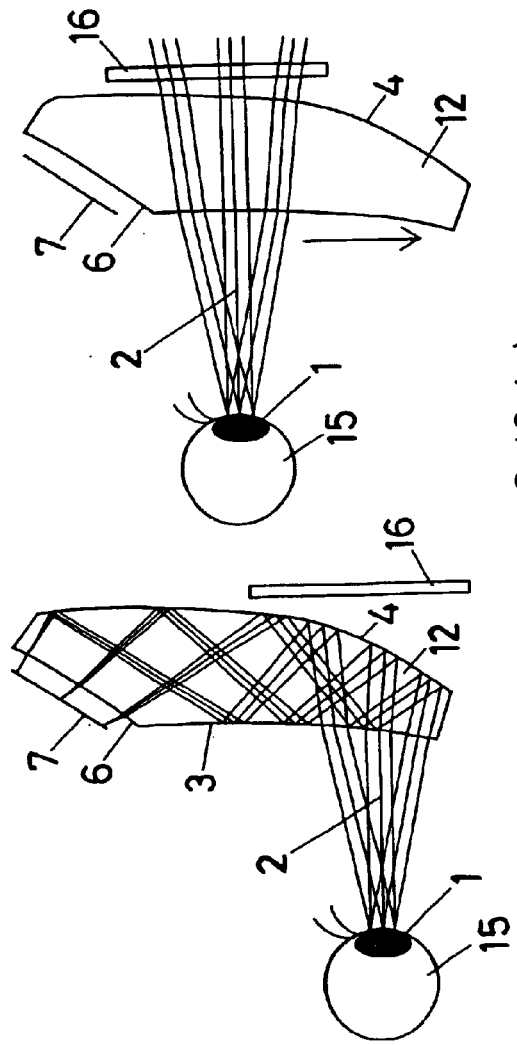
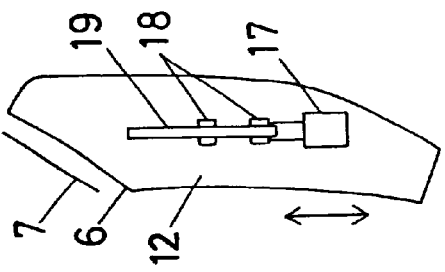

FIG. 20(a)
FIG. 20(b)
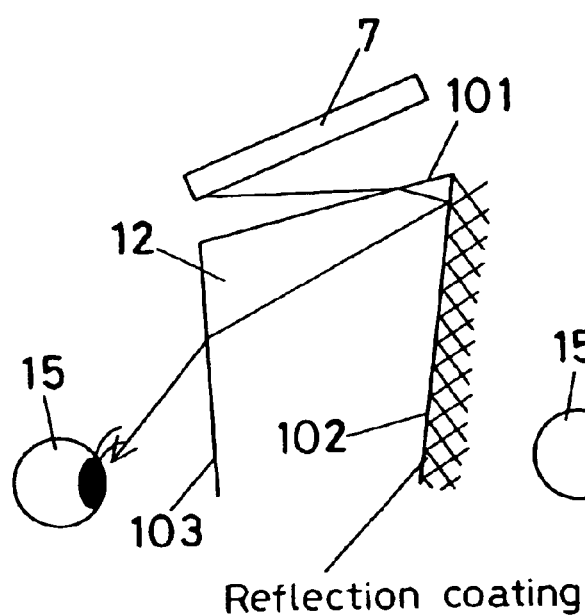
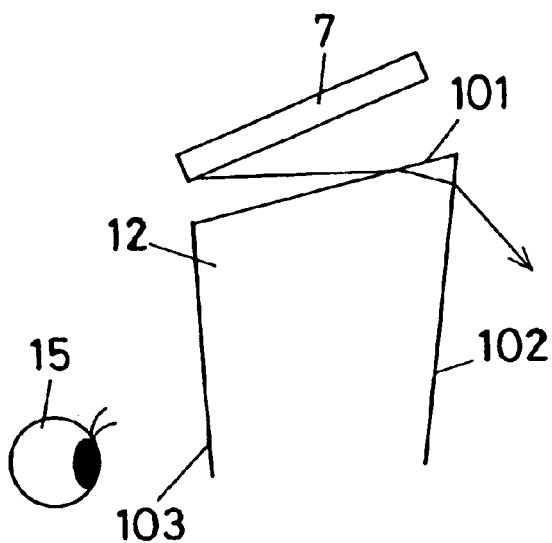
Reflection coating

PRISM OPTICAL ELEMENT, IMAGE OBSERVATION APPARATUS AND IMAGE DISPLAY APPARATUS

CROSS REFERENCE TO RELATED APPLICATIONS

This application is a continuation of U.S. application Ser. No. 09/570,652, filed May 12, 2000, now abandoned, which was a divisional application of U.S. application Ser. No. 08/867,779, filed Jun. 3, 1997, (now abandoned), the specifications of which are incorporated by reference for all purposes.

BACKGROUND OF THE INVENTION

1. Field of the Invention

The present invention relates to a prism optical element, an image observation apparatus and an image display apparatus. More particularly, the present invention relates to a head- or face-mounted image display apparatus that can be retained on the observer's head or face.

2. Discussion of Related Art

An example of a conventional head- or face-mounted image display apparatus, an image display apparatus disclosed in Japanese Patent Application Unexamined Publication (KOKAI) No. 3-101709 (19910 is known. In this image display apparatus, an image that is displayed by an image display device is transmitted as an aerial image by a relay optical system including a positive lens, and the aerial image is projected into an observer's eyeball as an enlarged image by an ocular optical system formed from a concave reflecting mirror.

U.S. Pat. No. 4,669,810 discloses another type of convention image display apparatus. In this apparatus, an image of a CRT is transmitted through a relay optical system to form an intermediate image, and the image is projected into an observer's eye by a combination of a reflection holographic element and a combiner having a hologram surface.

U.S. Pat. No. 4,026,641 discloses another type of conventional image display apparatus. In the conventional image display apparatus, an image of an image display device is transferred to a curved object surface by an image transfer device, and the image transferred to the object surface is projected in the air by a toric reflecting surface.

U.S. Reissued Pat. No. 27,356 discloses another type of conventional image display apparatus. This apparatus is an ocular optical system designed to project an object surface onto an exit pupil by a semi-transparent concave mirror and a semitransparent plane mirror.

Other known image display apparatuses include those which are disclosed in U.S. Pat. Nos. 4,322,135 and 4,969,724, European Patent No. 0,583,116A2, and Japanese Patent Application Unexamined Publication (KOKAI) No. 7-333551 (1995).

However, an image display apparatus of the type in which an image of an image display device is relayed, as in Japanese Patent Application Unexamined Publication (KOKAI) No. 3-101709 (1991) and U.S. Pat. No. 4,669,810, must use several lenses as a relay optical system in addition to an ocular optical system, regardless of the type of ocular optical system. Consequently, the optical path length increases, and the optical system increases in both size and weight.

Because a head-mounted image display apparatus is fitted to the human body, particularly the head, if the amount to which the apparatus projects from the user's face is large, the distance from the supporting point on the head to the center of gravity of the apparatus is long. Consequently, the weight of the apparatus is imbalanced when the apparatus is fitted to the observer's head. Further, when the observer moves or turns with the apparatus fitted to his/her head, the apparatus may collide with something. That is, it is important for a head-mounted image display apparatus to be small in size and light in weight. An essential factor in determining the size and weight of the apparatus is the arrangement of the optical system.

However, if an ordinary magnifier alone is used as an ocular optical system, exceedingly large aberrations are produced, and there is no device for correcting them. Even if spherical aberration can be corrected to a certain extent by forming the configuration of the concave surface of the magnifier into an aspherical surface, other aberrations such as coma and field curvature remain. Therefore, if the field angle for observation is increased, the image display apparatus becomes impractical. Alternatively, if a concave mirror alone is used as an ocular optical system, it is necessary to use not only ordinary optical elements (lens and mirror) but also a device for correcting field curvature by an image transfer device (fiber plate) having a surface which is curved in conformity to the field curvature produced.

In an image display apparatus of the type in which an image of an image display device is projected into an observer's eyeball by using a toric reflecting surface as in U.S. Pat. No. 4,026,641, field curvature that is produced by the decentered toric reflecting surface is corrected by curving the object surface itself. Therefore, it is difficult to use a flat display, e.g. an LCD (Liquid Crystal Display), as an image display device.

In a coaxial ocular optical system in which an object surface is projected on an observer's pupil by using a semitransparent concave mirror and a semitransparent plane mirror as in U.S. Reissued Pat. No. 27,356, because two semitransparent surfaces are used, the brightness of the image is reduced to as low a level as $\frac{1}{16}$, even in the case of a theoretical value. Further, because field curvature that is produced by the semitransparent concave mirror is corrected by curving the object surface itself, it is difficult to use a flat display, e.g. an LCD (Liquid Crystal Display), as an image display device.

SUMMARY OF THE INVENTION

In view of the above-described problems of the conventional techniques, an object of the present invention is to provide an extremely compact image observation apparatus and image display apparatus which are capable of providing an observation image that is clear and has minimal aberration and minimal distortion even at a wide field angle, and a prism optical element for use in these apparatuses.

To attain the above-described object, the present invention provides a prism optical element formed from a plurality of surfaces facing each other across a medium having a refractive index (n) larger than 1 (n>1). The prism optical element has a first surface, a second surface, a third surface, and a fourth surface. The first surface has both a transmitting action through which light rays enter the prism optical element or exit therefrom and a reflecting action by which light rays are internally reflected in the prism optical element. The second surface is disposed to face the first surface across the medium and has a reflecting action by which light rays are internally reflected in the prism optical element. The third surface is disposed substantially close to the second surface to face the first surface across the medium and has a reflecting action by which light rays are internally reflected in the prism optical element. The fourth surface has such a transmitting action that when the first surface has an action through which light rays enter the prism optical element, the fourth surface has an action through which light rays exit from the prism optical element, whereas, when the first surface has an action through which light rays exit from the prism optical element, the fourth surface has an action through which light rays enter the prism optical element. The prism optical element satisfies the following condition:

$$\sin^{-1}(1/n_d) \leq \theta_{r3} \leq 60° \quad (1)$$

where $n_d$ is the refractive index for the spectral d-line of the medium, and $\theta_{r3}$ is the angle of internal reflection of an arbitrary light ray at the third surface.

In the present invention, the arrangement of the second and third surfaces is not necessarily limited to the one in which surfaces designed separately from each other are disposed adjacent to each other, but includes an arrangement in which the second and third surfaces are formed by using one identical surface such that one region of the surface acts as the second surface, and another region of the surface acts as the third surface. In this case, an overlap region that acts as both the second and third surfaces may be present because a bundle of light rays has a width.

One image observation apparatus according to the present invention has an image forming device and an ocular optical system having an action by which an image formed by the image forming device is led to an eyeball of an observer. The ocular optical system includes a prism member having at least three surfaces. The space between the at least three surfaces is filled with a single medium having a refractive index (n) larger than 1 (n>1). The prism member has an action by which light rays emitted from the image forming device are internally reflected at least three times. At least two of the at least three internal reflections are total reflections. At least one of the at least two total reflections is performed by a surface disposed on a side of the single medium that is closer to the observer. The surface is curved so as to correct aberrations produced by the internal reflections in the prism member. At least two of the at least three surfaces of the prism member are disposed to face each other such that an external scene can be observed through the at least two surfaces, and that a distortion produced when the external scene is observed through the single medium is minimized.

Another image observation apparatus according to the present-invention has an image forming device and an ocular optical system having an action by which an image formed by the image forming device is led to an eyeball of an observer. The ocular optical system includes at least a prism member. The prism member has at least four optical surfaces having a transmitting or reflecting optical action. The space surrounded by the at least four optical surfaces is filled with a single medium having a refractive index (n) larger than 1 (n>1). The at least four optical surfaces include a first surface, a second surface, a third surface, and a fourth surface. The first surface has both a transmitting action and a reflecting action and is disposed on a side of the prism member that is closer to the observer's eyeball. The second surface has a reflecting action and is disposed to face the first surface across the medium. The second surface is at least decentered or tilted with respect to the observer's visual axis. The third surface has a reflecting action and is disposed to face the first surface across the medium at a position substantially adjacent to the second surface. The fourth surface is disposed such that one end thereof is substantially adjacent to the first surface, and the other end thereof is substantially close to the third surface. At least the third surface has a totally reflecting action. The first surface, the single medium and the third surface are arranged to have an external scene observation action by which an external scene can be observed through the first surface, the single medium and the third surface.

Still another image observation apparatus according to the-present invention has an image forming device and an ocular optical system having an action by which an image formed by the image forming device is led to an eyeball of an observer. The ocular optical system includes at least a prism member. The prism member has at least four optical surfaces having a transmitting or reflecting optical action. The space surrounded by the at least four surfaces is filled with a single medium having a refractive index (n) larger than 1 (n>1). The at least four optical surfaces include a first surface, a second surface, a third surface, and a fourth surface. The first surface has both a transmitting action and a reflecting action and is disposed on a side of the prism member that is closer to the observer's eyeball. The second surface has a reflecting action and is disposed to face the first surface across the medium. The second surface is at least decentered or tilted with respect to the observer's visual axis. The third surface has a reflecting action and is disposed to face the first surface across the medium at a position substantially adjacent to the second surface. The fourth surface is disposed such that one end thereof is substantially adjacent to the first surface, and the other end thereof is substantially close to the third surface. At least the second or third surface has a totally reflecting action. In addition, a line-of-sight detecting device for detecting an observer's line of sight is disposed near a totally reflecting region of the second or third surface that has a totally reflecting action.

An image display apparatus according to the present invention has an image display device and an ocular optical system for leading an image formed by the image display device to an eyeball of an observer such that the image can be observed as a virtual image. The ocular optical system includes a decentered prism in which a space formed by at least two surfaces is filled with a medium having a refractive index larger than 1. The at least two surfaces include a first surface positioned immediately in front of the observer's eyeball, and a second surface which is a reflecting surface facing the first surface. At least one of the at least two surfaces is a curved surface decentered or tilted with respect to the observer's visual axis. The ocular optical system further includes an aberration correcting device disposed outside the second surface to correct aberrations due to decentration produced by the first and second surfaces with respect to light from an external scene.

Another image display apparatus according to the present invention has an image display device and an ocular optical system for leading an image formed by the image display device to an eyeball of an observer such that the image can be observed as a virtual image. The ocular optical system includes a decentered prism in which a space formed by at least three surfaces is filled with a medium having a refractive index larger than 1. The at least three surfaces include a refracting and internally reflecting surface positioned immediately in front of the observer's eyeball; an outside world-side internally reflecting surface disposed on the outside world side of the ocular optical system to face the refracting and internally reflecting surface; and a refracting surface through which a bundle of light rays emitted from the image display device enters the decentered prism. At least one of the at least three surfaces is decentered or tilted with respect to the observer's visual axis. The at least three surfaces are arranged to perform at least three internal reflections. The ocular optical system further includes a second optical element that cancels a power produced by the refracting and internally reflecting surface, which is positioned immediately in front of the observer's eyeball, and the outside world-side internally reflecting surface with respect to external light when an external scene is observed through the two surfaces. The second optical element is disposed on the outside world side of the outside world-side internally reflecting surface.

In the present invention, the arrangement of the second and third surfaces is not necessarily limited to the one in which surfaces designed separately from each other are disposed adjacent to each other, but includes an arrangement in which the second and third surfaces are formed by using one identical surface such that one region of the surface acts as the second surface, and another region of the surface acts as the third surface. In this case, an overlap region that acts as both the second and third surfaces may be present because a bundle of light rays has a width.

The arrangements and operations of the prism optical element, image observation apparatus and image display apparatus according to the present invention will be described. In the description of the image observation apparatus and image display apparatus in particular, the explanation will be made on the basis of backward ray tracing in which light rays are traced from the observer's pupil position toward the image display device for the convenience of designing the optical system, unless otherwise specified.

In the image observation apparatus according to the present invention, light rays from the image display device (image forming device) are internally reflected three times in the ocular optical system, thereby enabling the optical path to be folded very effectively, and thus realizing an extremely thin ocular optical system. Two of the three internal reflections are specified as total reflections. Consequently, the area that requires reflection coating is markedly reduced, thereby succeeding in realizing a compact, lightweight and low-cost ocular optical system. By specifying two of the three reflections as total reflections, it is possible to minimize the incidence of a ghost image due to the occurrence of unwanted light or the reduction in contrast caused by flare. Usually, in an optical system having internal reflection and filled with an optical medium having a refractive index larger than 1, the influence of unwanted light emerging from an image display device at a large exit angle and unwanted light due to reflection in a path other than the proper ray path gives rise to a problem. In the present invention, the number of reflection coating surfaces is reduced by using two totally reflecting surfaces. Consequently, unwanted light other than the desired bundle of light rays emanating from the image display device and reaching the observer's pupil is transmitted by the two internally reflecting surfaces. Thus, unwanted light reaching the observer's pupil is markedly reduced.

The above-described action will be described in detail with reference to FIGS. 20(a) and 20(b). FIGS. 20(a) and 20(b) are fragmentary enlarged views showing a part of a decentered prism 12 through which light from an image display device 7 enters. The decentered prism 12 has three surfaces 101, 102 and 103 decentered with respect to the optical axis, and the space formed by the surfaces 101, 102 and 103 is filled with a medium having a refractive index larger than 1. Reference numeral 15 denotes an observer's eyeball. Reference numeral 101 denotes an entrance surface. Reference numeral 102 denotes an outside world-side reflecting or totally reflecting surface. Reference numeral 103 denotes an observer-side refracting or reflecting surface. FIG. 20(a) shows an arrangement in which the reflecting surface 102 is provided with reflection coating. FIG. 20(b) shows an arrangement in which the reflecting surface 102 is a totally reflecting surface, which is provided with no reflection coating. In the case of FIG. 20(a), light emitted from the left-hand end of the image display device 7 at a large exit angle enters the decentered prism 12 while being refracted by the entrance surface 101. The incident light is reflected by the reflecting surface 102, which is provided with reflection coating. The reflected light passes through the refracting surface 103 and enters the observer's eyeball 15. Accordingly, the observer sees an unwanted electronic image in the upper part of the observer's visual field in addition to the proper image (hereinafter referred to as "electronic image") of the image display device 7. Alternatively, flare appears in the upper part of the observer's visual field.

In the case of FIG. 20(b), light emitted from the left-hand end of the image display device 7 at a large exit angle enters the decentered prism 12 while being refracted by the entrance surface 101, and is incident on the reflecting surface 102, which is provided with no reflection coating. Because the incident angle is smaller than the critical angle, the unwanted light passes through the reflecting surface 102. Accordingly, the unwanted light is transmitted to a side of the decentered prism 12 that is remote from the observer and therefore does not enter the observer's eyeball 15. In other words, neither a ghost image nor flare occurs.

The above-described action can be similarly caused to take place at any totally reflecting surface in addition to the reflecting surface in this example. That is, the above-described action can be attained by setting the optical system such that a bundle of light rays in the ray path for observation of the proper electronic image has an incident angle not smaller than the critical angle, and that any other ray bundle having an exit angle which may cause ghost or flare has an incident angle smaller than the critical angle at a totally reflecting surface. It becomes easy to obtain the above-described effect by setting two totally reflecting surfaces as described above. Thus, it becomes possible to provide the observer with a clear observation image which is free from a ghost image and which has a minimal reduction in contrast due to flare.

First, assuming that the prism optical element according to the present invention is used as an ocular optical system (observation optical system) of an image observation apparatus or an image display apparatus, the prism optical element is formed from a prism member in which at least three internal reflection take place, and the prism member is filled with a medium having a refractive index larger than 1. Therefore, the ocular optical system can be made extremely thin by the above-described optical path folding effect. In addition, aberration correction can be made even more effectively by the arrangement in which at least three internal reflections take place. Thus, it is possible to present an observation image which is clear as far as the edges of the image field. In this regard, the prism optical element according to the present invention will be described below more specifically.

The principal power of the prism optical element is given by the second surface, which is a reflecting surface. In this case, the second surface can be formed with a large radius of curvature in comparison to a refracting system of the same power as that of the reflecting surface. Therefore, aberrations produced by the second surface can be minimized. Further, the outside world-side reflecting surface is divided into two different surfaces (i.e. the second and third surfaces). Therefore, it becomes possible to set the direction of reflected light as desired independently of the curvature of each surface. Accordingly, the optical system can be so shaped as to conform to the curve of the observer's face, and the image display device can be disposed such that the back of the device faces the observer. In particular, when the image display device is an LCD or the like that requires a back light, the back light and the associated electric system are provided on the observer side. Therefore, no part of the image display device projects forwardly, and the amount to which the whole image display apparatus projects from the observer's face can be minimized.

In general, when a concave mirror is decentered or tilted with respect to the optical axis, aberrations due to decentration are produced, which do not occur in a coaxial system. In the case of the prism optical element according to the present invention also, when it is used in an image observation apparatus or an image display apparatus, aberrations due to decentration are produced because the second surface is decentered or tilted with respect to the observer's visual axis. In particular, astigmatism and coma occur even on the optical axis because there is a difference in power between a direction along a plane containing the optical path of the axial principal ray (i.e. tangential direction) and a direction perpendicular to a plane containing the visual axis and the optical path of the axial principal ray (i.e. sagittal direction). The aberrations due to decentration produced by the second surface can be corrected by forming at least one of the at least four surfaces constituting the prism optical element from a surface having different powers in the tangential and sagittal directions, i.e. a rotationally asymmetric surface.

An even more effective way of correcting the aberrations due to decentration is to use a surface having only one plane of symmetry to form at least one of the surfaces constituting the prism optical element. When the image display device is disposed on the observer's visual axis (i.e. axial principal ray), a bilaterally symmetric observation image can be projected into the observer's eyeball by using a surface having a plane of symmetry in the sagittal direction as at least one of the surfaces constituting the ocular optical system. On the other hand, if the surface is arranged to have no plane of symmetry in the tangential direction, the degree of freedom in the tangential direction increases, and it is possible to even more favorably correct decentration aberrations occurring in a plane containing the optical path of the axial principal ray.

When the above-described ocular optical system comprises at least four surfaces, reflection taking place at the first surface may be total reflection. If the first surface, which is a surface disposed immediately in front of the observer's pupil, is a totally reflecting surface, a region through which light rays exit from the ocular optical system and an internally reflecting region can be arranged to overlap each other. In other words, a single surface can be arranged to perform both transmitting and reflecting actions. Accordingly, it is possible to construct a compact ocular optical system.

In addition, it is possible to provide a clearer observation image because the above-described ghost and flare reducing effect by the totally reflecting surface can also be obtained at the first surface. Further, because only the second surface requires reflection coating, the productivity improves, and a lower-cost image display apparatus can be realized.

In the above-described prism optical element, it is desirable to satisfy the following condition:

$$\sin^{-1}(1/n_d) \leq \theta_{r3} \leq 60° \qquad (1)$$

where $n_d$ is the refractive index for the spectral d-line of the medium, and $\theta_{r3}$ is the angle of internal reflection of an arbitrary light ray at the third surface.

It is important to satisfy the condition (1). By setting $\theta_{r3}$ equal to or greater than $\sin^{-1}(1/n_d)$, the angle of internal reflection at the third surface becomes equal to or greater than the critical angle. Consequently, it is possible for an arbitrary light ray emitted from the image display device to be totally reflected at the third surface.

If the angle of reflection at the third surface is excessively large, the prism optical element becomes undesirably long in the direction (tangential direction) perpendicular to the visual axis. In the case of a wide-field image display apparatus in particular, extra-axial rays diverge to such an extent that the rays cannot reach the first surface, which is the subsequent reflecting surface. Consequently, it becomes impossible to realize the desired image display apparatus. Accordingly, it is desirable that at the third surface the angle of internal reflection of an arbitrary light ray emitted from the image display device should be set not larger than the upper limit of the condition (1), i.e. 60°.

It is more desirable to satisfy the following condition:

$$\sin^{-1}(1/n_d) \leq \theta_{r3} \leq 50° \qquad (2)$$

Because the third surface is a curved surface tilted or decentered with respect to the optical axis (axial principal ray), the angle of reflection at this surface should be as small as possible. The smaller the reflection angle, the smaller the amount of aberration caused by decentration, particularly comatic aberration due to decentration. Accordingly, it is desirable that at the third surface the angle of internal reflection of an arbitrary light ray emitted from the image display device should be set not greater than the upper limit of the condition (2), i.e. 50°.

It is important from the viewpoint of realizing a low-cost image display apparatus to use a plane surface as at least one of the surfaces constituting the prism optical element. By doing so, another surface can be defined on the basis of the at least one plane surface. Therefore, it is possible to facilitate the mechanical design and production of an optical system. Consequently, it is possible to shorten the machining or processing time and to facilitate the layout of the whole apparatus. Thus, it is possible to realize substantial reductions in manufacturing costs.

Similar advantageous effects can be obtained by using a spherical surface as at least one of the surfaces constituting the prism optical element. In this case, another surface can be readily defined on the basis of the at least one spherical surface. Therefore, the layout of the whole apparatus is also facilitated. Thus, it is possible to realize substantial reductions in manufacturing costs.

It is desirable that the refractive index n of the medium constituting the prism optical element should be larger than 1.3.

It will be clear from the foregoing description that an observation optical apparatus can be constructed by disposing the above-described prism optical element in an observation optical system.

In this case, the prism optical element may be disposed in an objective lens. Alternatively, the prism optical element may be disposed in an image erecting device which is disposed behind an objective lens to erect an object image formed by the objective lens. In the latter arrangement, the prism optical element can be arranged to have both an image erecting action and an ocular lens action.

The prism optical element according to the present invention can be used to construct a head-mounted image display apparatus having an image forming device consisting essentially of an LCD (Liquid Crystal Display) or a CRT disposed to face the fourth surface of the prism optical element, or an image forming device consisting essentially of an LCD, a CRT or the like which is relayed by a relay optical system. The head-mounted image display apparatus further has a retaining member adapted to retain both the prism optical element and the image forming device on the observer's face. A bundle of light rays emitted from the image forming device enters the prism optical element through the fourth surface and passes sequentially along the optical path in the prism optical element. More specifically, the incident ray bundle is reflected successively by the third surface, the first surface and the second surface and exits from the prism optical element through the first surface.

In the present invention, the second and third surfaces may be formed from a single identical surface. In this case, the number of physical surfaces can be reduced by one, and it is therefore possible to simplify the process in terms of the optical design and the production of prism and hence possible to contribute to the achievement of an increase in mass-productivity and reductions in costs. It is desirable that a physically single surface should be arranged to have both the functions of the second and third surfaces, and that internally reflecting regions should overlap each other. By doing so, it is possible to realize a reduction in the size of the prism member.

One image observation apparatus according to the present invention has an image forming device and an ocular optical system having an action by which an image formed by the image forming device is led to an eyeball of an observer. The ocular optical system includes a prism member having at least three surfaces. The space between the at least three surfaces is filled with a single medium having a refractive index (n) larger than 1 (n>1). The prism member has an action by which light rays emitted from the image forming device are internally reflected at least three times. At least two of the at least three internal reflections are total reflections. At least one of the at least two total reflections is performed by a surface disposed on a side of the single medium that is closer to the observer. The surface is curved so as to correct aberrations produced by the internal reflections in the prism member. At least two of the at least three surfaces of the prism member are disposed to face each other such that an external scene can be observed through the at least two surfaces, and that a distortion produced when the external scene is observed through the single medium is minimized.

In the image observation apparatus according to the present invention, the third surface 5 is a totally reflecting surface, which is provided with no reflection coating. Therefore, external light passing through the third surface 5 and the first surface 3 reaches the observer's eyeball 15. Accordingly, it is possible to observe an external scene in a range α different from an electronic image observation range β. The fact that the observer can observe an external scene image and an electronic image in different partial regions of the visual field means that the observer can simultaneously observe the external scene in the upper region of the observer's visual field and the electronic image in the lower region of the visual field, by way of example. It should, however, be noted that the partial regions of the visual field for observation of different images may be divided in any direction and in any form, e.g. upper and lower regions, or left and right regions, as long as the observer can observe the different images in the respective partial regions. This function enables the observer to recognize the outside world with the image observation apparatus mounted on his or her head or face. Thus, it is possible to provide a safe image observation apparatus that enables the observer to avoid a dangerous situation and to cope with an emergency situation. Consequently, the range of applications of the image observation apparatus widens.

In this image observation apparatus, it is desirable that the image forming device should be an image display device, e.g. an LCD or a CRT disposed such that the image forming surface thereof faces the fourth surface (it should be noted that an image display device which is relayed by a relay optical system is not expected as the image forming device in the image observation apparatus), and that the second surface should be formed from a curved surface.

The above-described image observation apparatus can be constructed as a head-mounted image display apparatus by providing a retaining member that retains both the image display device and the ocular optical system in front of an observer's eyeball, and arranging the prism member such that a bundle of light rays emitted from the image display device enters the prism member through the fourth surface, and the incident ray bundle is reflected successively by the third surface, the first surface and the second surface so as to exit from the first surface.

In the above-described image observation apparatus, the prism member may be fixed at the same position regardless of whether the observer views the image formed by the image forming device or an image of an external scene. In this case, it is desirable that the image from the image forming device and the external-scene image should be capable of being observed in the respective partial regions through the first and third surfaces, as described later with reference to FIG. 7.

The prism member may be provided with a switching device that moves the prism member so as to enable observation modes to change between the observation of the image formed by the image forming device and the observation of the external-scene image.

More specifically, if the prism member is moved such that the first surface of the ocular optical system, which is disposed immediately in front of the observer's eyeball, and the third surface, which is disposed on the outside world side of the ocular optical system to totally reflect a part of the principal rays, lie in the vicinity of the observer's visual axis, the observer can view an external-scene image around the observer's visual axis lying when he or she looks straight ahead, i.e. in the vicinity of the center of the visual field. Therefore, the observer can confirm the external scene in front of his/her eye with the image display apparatus mounted on his/her head or face. Accordingly, it is possible to realize an image display apparatus ensured safety.

If the electronic image is kept displayed, the external scene can be confirmed by moving and returning the ocular optical system to thereby switch the external-scene image and the electronic image from each other. Accordingly, the range of applications widens.

In this case, it is desirable for the switching device to move the prism member such that an optical path extending from the prism member to the observer's eyeball to observe the image formed by the image forming device is approximately coincident with an optical path extending from the prism member to the observer's eyeball to observe the external-scene image.

If the prism member is adapted to move along a plane containing the optical path of the axial principal ray, the movement of the prism member is rectilinear. Therefore, the arrangement of the moving mechanism is simplified, and the layout of the whole apparatus is facilitated. Consequently, a low-cost image display apparatus can be realized.

If the prism member is movable in a direction perpendicular to the visual axis, the layout of the whole apparatus is facilitated, and the arrangement of the moving mechanism is simplified. Moreover, because there is no change in the amount to which the ocular optical system projects forward from the observer's face even after the movement of the ocular optical system, a small-sized and compact image display apparatus can be provided.

If the prism member is rotatable, it is possible to observe the external scene by moving the prism member through a simple rotating mechanism. Therefore, the mechanism itself becomes less costly. Moreover, if the prism members for the left and right eyes are simultaneously rotated, the external scene can be confirmed with both eyes. Accordingly, the safety is enhanced, and the layout of the apparatus can be simplified.

Another image observation apparatus according to the present invention has an image forming device and an ocular optical system having an action by which an image formed by the image forming device is led to an eyeball of an observer. The ocular optical system includes at least a prism member. The prism member has at least four optical surfaces having a transmitting or reflecting optical action. The space surrounded by the at least four optical surfaces is filled with a single medium having a refractive index (n) larger than 1 (n>1). The at least four optical surfaces include a first surface, a second surface, a third surface, and a fourth surface. The first surface has both a transmitting action and a reflecting action and is disposed on a side of the prism member that is closer to the observer's eyeball. The second surface has a reflecting action and is disposed to face the first surface across the medium. The second surface is at least decentered or tilted with respect to the observer's visual axis. The third surface has a reflecting action and is disposed to face the first surface across the medium at a position substantially adjacent to the second surface. The fourth surface is disposed such that one end thereof is substantially adjacent to the first surface, and the other end thereof is substantially close to the third surface. At least the third surface has a totally reflecting action. The first surface, the single medium and the third surface are arranged to have an external scene observation action by which an external scene can be observed through the first surface, the single medium and the third surface. It should be noted that the term "a surface other than the four optical surfaces" as used in this description means a prism side surface or a cut surface which has no optical action.

These image observation apparatuses are arranged such that an external scene can be observed through the surface disposed immediately in front of the observer's eyeball and the surface disposed on the outside world side of the ocular optical system. The action and effect of this arrangement will be described below with reference to FIG. 7. FIG. 7 is a sectional view of a decentered prism 12 in which a space formed by four surfaces 3, 4, 5 and 6 which are decentered with respect to an optical axis is filled with a medium having a refractive index larger than 1. In the figure, reference numeral 1 denotes an observer's pupil; 2 denotes an observer's visual axis; 3 denotes a first surface of the decentered prism 12; 4 denotes a second surface of the decentered prism 12; 5 denotes a third surface of the decentered prism 12; 6 denotes a fourth surface of the decentered prism 12; 7 denotes an image display device; 15 denotes an observer's eyeball; and 16 denotes an optical filter. In the actual path of light rays from the image display device 7, light rays emitted from the image display device 7 enter the decentered prism 12 through the fourth surface 6 and are totally reflected by the third surface 5. The reflected light rays are totally reflected by the first surface 3 and then reflected by the second surface 4. Then, the reflected light rays pass through the first surface 3 to project the image of the image display device 7 into the observer's eyeball 15 with the observer's pupil 1 as an exit pupil.

In the image observation apparatuses according to the present invention, the third surface 5 is a totally reflecting surface, which is provided with no reflection coating. Therefore, external light passing through the third surface 5 and the first surface 3 reaches the observer's eyeball 15. Accordingly, an external scene can be observed in a range $\alpha$ different from an electronic image observation range $\beta$. The fact that the observer can observe an external scene image and an electronic image in different partial regions of the visual field means that the observer can simultaneously observe the external scene in the upper region of the observer's visual field and the electronic image in the lower region of the visual field, by way of example. It should, however, be noted that the partial regions of the visual field for observation of different images may be divided in any direction and in any form, e.g. upper and lower regions, or left and right regions, as long as the observer can observe the different images in the respective partial regions. This function enables the observer to recognize the external scene with the image observation apparatus mounted on his or her head or face. Thus, it is possible to provide a safe image observation apparatus that enables the observer to avoid a dangerous situation and to cope with an emergency situation. Consequently, the range of applications of the image observation apparatus widens.

In this image observation apparatus, it is desirable that the image forming device should be an image display device, e.g. an LCD or a CRT disposed such that the image forming surface thereof faces the fourth surface (it should be noted that an image display device which is relayed by a relay optical system is not expected as the image forming device in the image observation apparatus), and that the second surface should be formed from a curved surface.

The above-described image observation apparatus can be constructed as a head-mounted image display apparatus by providing a retaining member that retains both the image display device and the ocular optical system in front of an observer's eyeball, and arranging the prism member such that a bundle of light rays emitted from the image display device enters the prism member through the fourth surface, and the incident ray bundle is reflected successively by the third surface, the first surface and the second surface so as to exit from the first surface.

In the above-described image observation apparatus, it is desirable to arrange the surface disposed immediately in front of the observer's eyeball and the surface disposed on the outside world side of the ocular optical system such that the composite power of the two surfaces for external light at respective arbitrary positions thereof is approximately zero. If the composite power for external light is approximately zero, conditions under which an image of an external scene is observed become approximately equal to those for observation with the naked eye, and the external scene can be observed even more naturally. Accordingly, when a dangerous or emergency situation occurs, the external scene can be accurately recognized. Consequently, a remarkably safe image display apparatus can be provided.

In this case, the first and third surfaces may be formed from curved, spherical or plane surfaces. When the observer views the external scene, light rays from the external scene pass through the totally reflecting region of the internally reflecting surface disposed on the outside world side of the ocular optical system and further through the refracting surface disposed immediately in front of the observer's eyeball and are projected into the observer's pupil. If the two surfaces are not aspherical surfaces but spherical surfaces, an even more natural external-scene image can be readily observed at an off-axis position because there is no change in the curvature of each surface. If the first surface, which is disposed immediately in front of the observer's eyeball, and the third surface, which is disposed on the outside world side of the ocular optical system, are plane surfaces, a natural external-scene image can be observed because each surface has no power. In a case where the two surfaces are perpendicular to the observer's visual axis and parallel to each other, the external scene is observed through merely transparent plates. Accordingly, it is possible to observe an extremely natural external-scene image.

Assuming that $\phi_{t1}$ denotes the composite power for external light at respective arbitrary regions of the surface disposed immediately in front of the observer's eyeball and the surface disposed on the outside world side of the ocular optical system, it is desirable to satisfy the following condition:

$$-0.5 \leq \phi_{t1} \leq 0.5 \text{ (1/millimeter)} \tag{3}$$

where $\phi_{t1}$ corresponds to each of the power $\phi_{t1}$ (yz) in a plane containing the axial principal ray and the power $\phi_{t1}$ (xz) in a plane perpendicular to the plane containing the axial principal ray.

By satisfying the condition (3), the magnification for external light passing through the decentered prism can be set in the neighborhood of 1. Therefore, it is possible to observe an even more natural external-scene image.

In the above-described image observation apparatus, the prism member may be fixed at the same position regardless of whether the observer views an image formed by the image forming device or an external-scene image. In this case, it is desirable that the image from the image forming device and the external-scene image should be capable of being observed in the respective partial regions through the first and third surfaces, as stated above with reference to FIG. 7.

The prism member may be provided with a switching device that moves the prism member so as to enable observation modes to change between the observation of the image formed by the image forming device and the observation of the external-scene image.

More specifically, if the prism member is moved such that the first surface of the ocular optical system, which is disposed immediately in front of the observer's eyeball, and the third surface, which is disposed on the outside world side of the ocular optical system to totally reflect a part of the principal rays, lie in the vicinity of the observer's visual axis, the observer can view an external-scene image around the observer's visual axis lying when he or she looks straight ahead, i.e. in the vicinity of the center of the visual field. Therefore, the observer can confirm the external scene in front of his/her eye with the image display apparatus mounted on his/her head or face. Accordingly, it is possible to realize an image display apparatus ensured safety.

If the electronic image is kept displayed, the external scene can be confirmed by moving and returning the ocular optical system to thereby switch the external-scene image and the electronic image from each other. Accordingly, the range of applications widens.

In this case, it is desirable to arrange the surface disposed immediately in front of the observer's eyeball and the surface disposed on the outside world side of the ocular optical system such that the composite power of the two surfaces for external light at respective arbitrary positions thereof is approximately zero. If the composite power for external light is approximately zero, the external scene can be observed even more naturally. Accordingly, it is possible to avoid a dangerous situation and to cope appropriately with an emergency situation. Consequently, a remarkably safe image display apparatus can be provided.

Assuming that $\phi_{t2}$ denotes the composite power for external light at respective arbitrary positions of the surface disposed immediately in front of the observer's eyeball and the surface disposed on the outside world side of the ocular optical system, it is desirable to satisfy the following condition:

$$-0.5 \leq \phi_{t2} \leq 0.5 \text{ (1/millimeter)} \tag{4}$$

where $\phi_{t2}$ corresponds to each of the power $\phi_{t2}$ (yz) in a plane containing the axial principal ray and the power $\phi_{t2}$ (xz) in a plane perpendicular to the plane containing the axial principal ray.

By satisfying the condition (4), the magnification for external light passing through the decentered prism can be set in the neighborhood of 1. Therefore, it is possible to observe an even more natural external-scene image.

In this case, it is desirable for the switching device to move the prism member such that an optical path formed from the prism member to the observer's eyeball to observe an image formed by the image forming device is approximately coincident with an optical path formed from the prism member to the observer's eyeball to observe an external-scene image.

If the prism member is adapted to move along a plane containing the optical path of the axial principal ray, the movement of the prism member is rectilinear. Therefore, the arrangement of the moving mechanism is simplified, and the layout of the whole apparatus is facilitated. Consequently, a low-cost image display apparatus can be realized.

If the prism member is movable in a direction perpendicular to the visual axis, the layout of the whole apparatus is facilitated, and the arrangement of the moving mechanism is simplified. Moreover, because there is no change in the amount to which the ocular optical system projects forward from the observer's face even after the movement of the ocular optical system, a small-sized and compact image display apparatus can be provided.

If the prism member is rotatable, it is possible to observe the external scene by moving the prism member through a simple rotating mechanism. Therefore, the mechanism itself becomes less costly. Moreover, if the prism members for the left and right eyes are simultaneously rotated, the external scene can be confirmed with both eyes. Accordingly, the safety is enhanced, and the layout of the apparatus can be simplified.

Still another image observation apparatus according to the present invention has an image forming device and an ocular optical system having an action by which an image formed by the image forming device is led to an eyeball of an observer. The ocular optical system includes at least a prism member. The prism member has at least four optical surfaces having a transmitting or reflecting optical action. The space surrounded by the at least four surfaces is filled with a single medium having a refractive index (n) larger than 1 (n>1). The at least four optical surfaces include a first surface, a second surface, a third surface, and a fourth surface. The first surface has both a transmitting action and a reflecting action and is disposed on a side of the prism member that is closer to the observer's eyeball. The second surface has a reflecting action and is disposed to face the first surface across the medium. The second surface is at least decentered or tilted with respect to the observer's visual axis. The third surface has a reflecting action and is disposed to face the first surface across the medium at a position substantially adjacent to the second surface. The fourth surface is disposed such that one end thereof is substantially adjacent to the first surface, and the other end thereof is substantially close to the third surface. At least second or third surface has a totally reflecting action. In addition, a line-of-sight detecting device for detecting an observer's line of sight is disposed near a totally reflecting region of the second or third surface that has a totally reflecting action. In this case also, the term "a surface other than the four optical surfaces" means a prism side surface or a cut surface which has no optical action.

The action and effect of the image observation apparatus when constructed as an image display apparatus will be described below. Disposing the line-of-sight detecting device near the optical system makes it possible to detect the observer's line of sight. Detection of the observer's line of sight will be described below with reference to FIGS. 5(a), 5(b) and 6. FIG. 5(a) is a sectional view of an image display apparatus comprising an image display device 7 and a decentered prism 12 in which a space formed by three surfaces 3, 4 and 6 decentered with respect to an optical axis is filled with a medium having a refractive index larger than 1. FIG. 5(b) is a sectional view of an image display apparatus comprising an image display device 7 and a decentered prism 12 in which a space formed by four surfaces 3, 4, 5 and 6 decentered with respect to an optical axis is filled with a medium having a refractive index larger than 1. FIG. 6 is a sectional view of another image display apparatus comprising an image display device 7 and a decentered prism 12 in which a space formed by four surfaces 3, 4, 5 and 6 decentered with respect to an optical axis is filled with a medium having a refractive index larger than 1. In these figures, reference numeral 1 denotes an observer's pupil; 2 denotes an observer's visual axis; 3 denotes a first surface of an ocular optical system 12; 4 denotes a second surface of the ocular optical system 12; 5 denotes a third surface of the ocular optical system 12; 6 denotes a fourth surface of the ocular optical system 12; 7 denotes an image display device; 9 denotes a line-of-sight detecting optical system; 10 denotes a line-of-sight detector; 11 denotes an illuminating device; 12 denotes an ocular optical system; and 15 denotes an observer's eyeball.

In the arrangement shown in FIG. 5(a), a line-of-sight detecting device comprising the line-of-sight detecting optical system 9 and the line-of-sight detector 10 is disposed on the outside world side of a decentered prism constituting the ocular optical system 12 so as to face the observer's eyeball 15 across the decentered prism. In this case, the image of the observer's pupil 1 needs to pass through the first surface 3, which is disposed immediately in front of the observer's pupil 1, and the second surface 4, which is a reflecting surface disposed on the outside world side of the ocular optical system 12, to enter the line-of-sight detecting device (9 and 10). However, the second surface 4, which is disposed on the outside world side of the ocular optical system 12, is a reflecting surface and hence provided with reflection coating. Accordingly, it is necessary in order to lead the image of the observer's pupil 1 to the line-of-sight detecting device (9 and 10) to provide the reflecting surface with a non-coated portion NC (i.e. a hole in the reflection coating). Such a non-coated portion NC would have an adverse effect on the image to be observed.

FIGS. 5(b) and 6 show image display apparatuses according to the present invention. The third surface 5, which is a reflecting surface disposed on the outside world side of the ocular optical system 12, is provided such that a part of the third surface 5 totally reflects light incident thereon. The totally reflecting portion of the third surface 5 can reflect light from the image display device 7 without the need of reflection coating. Accordingly, it is unnecessary to provide reflection coating. Thus, the image of the observer's pupil 1 passes through the first surface 3, which is disposed immediately in front of the observer's pupil 1, and further through the totally reflecting portion of the third surface 5, which is disposed on the outside world side of the ocular optical system, and it can be detected by the line-of-sight detecting device (9 and 10). Therefore, the observer's line of sight can be detected without the need for providing the reflecting surface of the ocular optical system 12 with a coating hole, which has an adverse effect on the observation of the electronic image.

In this case, it is desirable for the first surface of the decentered prism to have a totally reflecting action. In such a case, it is desirable that the line-of-sight detecting device should be disposed at a position where it detects the observer's line of sight through the totally reflecting region of the second or third surface.

It is desirable for the image display apparatus to have an illuminating device that illuminates the observer's eyeball. By illuminating the observer's eyeball, the image display apparatus can detect a bright image, and it is therefore possible to accurately detect the observer's line of sight. It is desirable that the illuminating device should be provided on the outside world side of the ocular optical system. If an illuminating device 11 is disposed between the observer's face and the ocular optical system 12 as shown in FIG. 5(a), the illuminating device 11 is likely to interfere with the observer's glasses or other thing. However, if the illuminating device 11 is disposed on the outside world side of the ocular optical system 12, it is possible to avoid an interference between the illuminating device 11 and the observer's face. If the illuminating device 11 is provided such that illuminating light from the illuminating device 11 passes through the totally reflecting portion of the reflecting surface of the ocular optical system 12, the observer's pupil can be illuminated without providing a coating hole.

It is desirable to use an illuminating device employing infrared light. Observation of the electronic image means that the observer's pupil is illuminated by light from the image display device. In the case of a line-of-sight detecting device that needs an image analysis by capturing a feeble virtual image, e.g. cornea reflection method, it is necessary to eliminate a reflection image formed by a bundle of light rays from the image display device, the illumination light quantity of which varies every moment. Usually, the image display device is an LCD or the like, which emits light in the visible wavelength region. Accordingly, the use of infrared light as light emitted from the illuminating device makes it possible to reduce the influence of light from the image display device.

In this case also, the image observation apparatus can be constructed as a head-mounted image display apparatus by providing a retaining member that retains the ocular optical system, the image forming device and the line-of-sight detecting device in front of an observer's face.

The above-described image observation apparatus may have a device for positioning the image forming device and the ocular optical system with respect to the observer's head.

Further, it is possible to observe a stereoscopic image with both eyes by providing a device for supporting at least a pair of such image observation apparatuses at a predetermined spacing.

Next, an image display apparatus according to the present invention has an image display device and an ocular optical system for leading an image formed by the image display device to an eyeball of an observer such that the image can be observed as a virtual image. The ocular optical system includes a decentered prism in which a space formed by at least two surfaces is filled with a medium having a refractive index larger than 1. The at least two surfaces include a first surface positioned immediately in front of the observer's eyeball, and a second surface which is a reflecting surface facing the first surface. At least one of the at least two surfaces is a curved surface decentered or tilted with respect to the observer's visual axis. The ocular optical system further includes an aberration correcting device disposed outside the second surface to correct aberrations due to decentration produced by the first and second surfaces with respect to light from an external scene.

In this image display apparatus, when an image of an external scene is observed through the first surface, which is positioned immediately in front of the observer's eyeball, and the second surface, which is a reflecting surface disposed to face the first surface, the external-scene image is observed in the same way as in the case of observing it through a lens having power asymmetric with respect to the optical axis because at least one of the first and second surfaces is decentered or tilted with respect to the observer's visual axis. Therefore, if an aberration correcting device, e.g. a Fresnel lens, which is arranged to cancel the eccentric power, is disposed on the outside world side of the second surface, it becomes possible for the observer to view an even more natural external-scene image. Further, because a Fresnel lens is an extremely thin optical element, it is possible to provide a compact image display apparatus without causing an increase in the size of the apparatus.

According to the present invention, the Fresnel lens may be replaced by another optical element, e.g. a diffractive optical element or a holographic optical element, provided that the above-described effect can be obtained.

When a Fresnel lens is used, it is desirable that the center of the annular zone of the Fresnel lens should lie in a plane containing the optical path of the axial principal ray from the image display device, and that the Fresnel lens should be decentered perpendicularly to the visual axis in the plane containing the optical path of the axial principal ray. If the Fresnel lens has an axially symmetric configuration, the apparatus becomes excellent in productivity, and the production cost can be reduced. If a Fresnel lens having an axially symmetric power is disposed in the plane containing the optical path of the axial principal ray in such a manner as to be decentered with respect to the visual axis, aberrations due to decentration which are produced by the first and second surfaces with respect to external light can be corrected even more favorably.

The Fresnel lens may be disposed such that the center of the annular zone of the Fresnel lens should lie in the plane containing the optical path of the axial principal ray, and that the Fresnel lens should be tilted with respect to the visual axial so as to extend along the surface configuration of the second surface. When disposed to extend along the surface configuration of the second surface, the Fresnel lens is tilted with respect to the observer's visual axis. Accordingly, it is possible to set a power asymmetric with respect to the optical axis and hence possible to correct even more favorably aberrations due to decentration which are produced by the first and second surfaces with respect to external light. Moreover, the amount to which the apparatus projects from the observer's face reduces, and the space between the ocular optical system and the Fresnel lens also reduces. Accordingly, it is possible to provide a remarkably compact image display apparatus having no useless space.

Another image display apparatus according to the present invention has an image display device and an ocular optical system for leading an image formed by the image display device to an eyeball of an observer such that the image can be observed as a virtual image. The ocular optical system includes a decentered prism in which a space formed by at least three surfaces is filled with a medium having a refractive index larger than 1. The at least three surfaces include a refracting and internally reflecting surface positioned immediately in front of the observer's eyeball; an outside world-side internally reflecting surface disposed on the outside world side of the ocular optical system to face the refracting and internally reflecting surface; and a refracting surface through which a bundle of light rays emitted from the image display device enters the decentered prism. The at least three surfaces are arranged to perform at least three internal reflections. The ocular optical system further includes a second optical element that cancels the power produced by the refracting and internally reflecting surface, which is positioned immediately in front of the observer's eyeball, and the outside world-side internally reflecting surface with respect to external light when an external scene is observed through the two surfaces. The second optical element is disposed on the outside world side of the outside world-side internally reflecting surface.

When an image of an external scene is observed through the first surface, which is positioned immediately in front of the observer's eyeball, and the second surface, which is a reflecting surface disposed to face the first surface, the external-scene image is observed in the same way as in the case of observing it through a lens having an eccentric power different for each image height because at least one of the first and second surfaces is decentered or tilted with respect to the observer's visual axis. Therefore, if the second optical element, which is adapted to cancel the eccentric power produced by the two surfaces with respect to external light, is disposed on the outside world side of the ocular optical system, it becomes possible for the observer to view an even more natural external-scene image in a wide range. Accordingly, it is possible to provide a safe image display apparatus which enables the observer to avoid a dangerous situation and to cope with an emergency situation.

In this case, the ocular optical system may be formed from a decentered prism in which a space formed by four surfaces is filled with a medium having a refractive index larger than 1. The four surfaces include a first surface positioned on the observer's eyeball side and serving as both refracting and reflecting surfaces; a second surface which is a reflecting surface disposed to face the first surface; a third surface which is a reflecting surface disposed to face the first surface at a position adjacent to the second surface; and a fourth surface which is a refracting surface closest to the image display device. At least one of the four surfaces is decentered or tilted with respect to the observer's visual axis. In a case where the ocular optical system comprises four surfaces as described above, the external scene is recognized by external light passing through the first and second surfaces. In this case, it is possible to realize an added function without increasing the overall size of the ocular optical system by disposing the second optical element adapted to cancel the eccentric power only at a region covering the second surface.

It is desirable to dispose at least one second optical element on the outside world side of the second or third surface so that the external scene can be observed through the first surface, the second surface and the second optical element or through the first surface, the third surface and the second optical element. If the second optical element having the action of canceling the eccentric power is provided on the outside world side of the second surface, a natural external-scene image can be observed in approximately the same region as the region for observation of the electronic image. If the second optical having the action of canceling the eccentric power is provided on the outside world side of the third surface, a natural external-scene image can be observed in a region different from the region for observation of the electronic image. If two second optical elements are disposed on the outside world sides of the second and third surfaces, respectively, the observer can view all the external-scene image passing through the first and second surfaces and through the first and third surfaces. Accordingly, the field angle for observation of the external-scene image becomes wider than the field angle for observation of the electronic image. Thus, a natural and wide external-scene image can be observed. Consequently, it is possible to provide a remarkably safe image display apparatus which enables the observer to avoid a dangerous situation and to cope appropriately with an emergency situation.

It is desirable for the second optical element to be capable of simultaneously canceling the composite power of the first and second surfaces and the composite power of the first and third surfaces with respect to external light. If the second optical element capable of simultaneously canceling the composite powers is formed from a single optical element and it is disposed on the outside world side of the ocular optical system, it is possible to observe the external scene over a wide range. Because the second optical element simultaneously cancels the composite powers, there is no break in the external-scene image. Thus, it is possible to observe an even more natural external-scene image. Accordingly, the external scene can be recognized over a wide range with a single optical element, and it is possible to provide an image display apparatus of reduced cost and enhanced safety which enables the observer to avoid a dangerous situation and to cope with an emergency situation.

The above-described image observation apparatus may have a device for positioning the image display device and the ocular optical system with respect to the observer's head. It becomes possible for the observer to see a stable electronic image by providing a device for positioning both the image display device and the ocular optical system with respect to the observer's head.

The image display apparatus may have a device for supporting both the image display device and the ocular optical system with respect to the observer's head such that the apparatus can be mounted on the observer's head. By allowing both the image display device and the ocular optical system to be mounted on the observer's head with a supporting device, it becomes possible for the observer to see the observation image in a desired posture and from a desired direction.

Further, it is possible to provide a device for supporting at least a pair of image display apparatuses at a predetermined spacing. It becomes possible for the observer to see the electronic image with both eyes without fatigue by providing a device for supporting at least two image display apparatuses at a predetermined spacing. Further, if images with a disparity therebetween are displayed on the right and left image display devices, and these images are observed with both eyes, it is possible to enjoy viewing a stereoscopic image.

The ocular optical system in the above-described image display apparatus can be used as an image-forming optical system. If the ocular optical system is arranged to form an image of an object at infinity with the image display surface in the ocular optical system defined as an image plane, the ocular optical system can be used as an image-forming optical system, e.g. a finder optical system for a camera such as that shown in FIG. 24.

It should be noted that in the present invention, the second and third surfaces may be formed from a single identical surface. In this case, the number of physical surfaces can be reduced by one, and it is therefore possible to simplify the process in terms of the optical design and the production of prism and hence possible to contribute to the achievement of an increase in mass-productivity and reductions in costs. It is desirable that a physically single surface should be arranged to have both the functions of the second and third surfaces, and that internally reflecting regions should overlap each other. By doing so, it is possible to realize a reduction in the size of the prism member.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 5(a) and 5(b) are sectional views for describing an optical system for a single eye of a head-mounted image display apparatus which uses an ocular optical system according to Example 5 of the present invention in comparison to a modification, in which FIG. 5(a) shows the modification, and FIG. 5(b) shows Example 5.

FIGS. 8(a), 8(b) and 8(c) are sectional views of an optical system for a single eye of a head-mounted image display apparatus which uses an ocular optical system according to Example 8 of the present invention.

FIGS. 19(a), 19(b) and 19(c) show a mechanism for moving an ocular optical system arranged as in Example 17 to change observation positions from an electronic image observation position to an external-scene image observation position, and also show a direction of movement for changing the observation positions.

FIGS. 20(a) and 20(b) are fragmentary sectional views for describing an action in which unwanted light is eliminated by a totally reflecting surface in the present invention.

DESCRIPTION OF THE PREFERRED EMBODIMENTS

Figure 1:
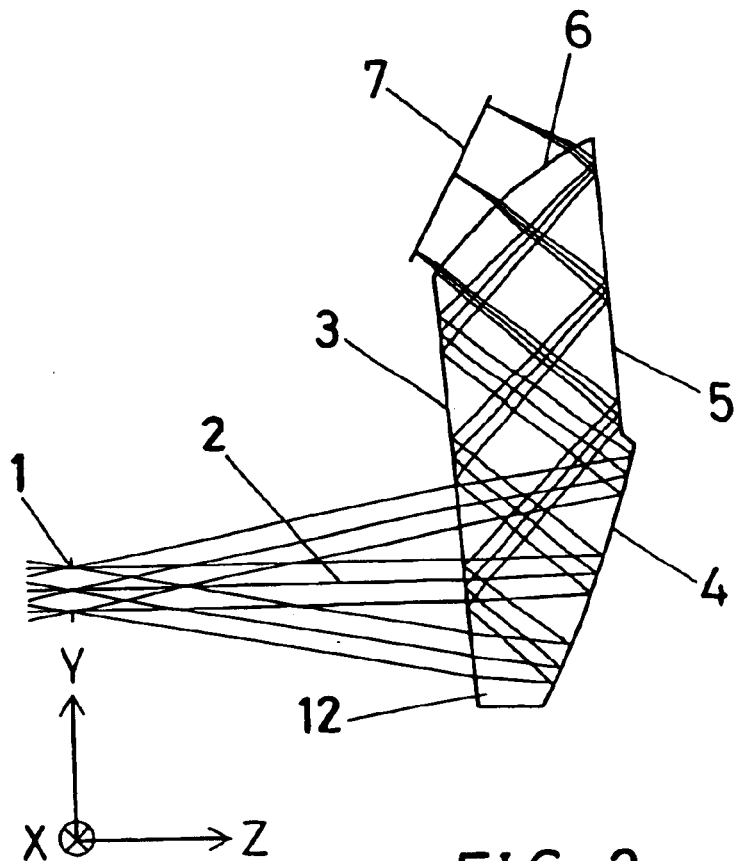
FIG. 1 is a sectional view of an optical system for a single eye of a head-mounted image display apparatus which uses an ocular optical system according to Example 1 of the present invention.
Figure 2:
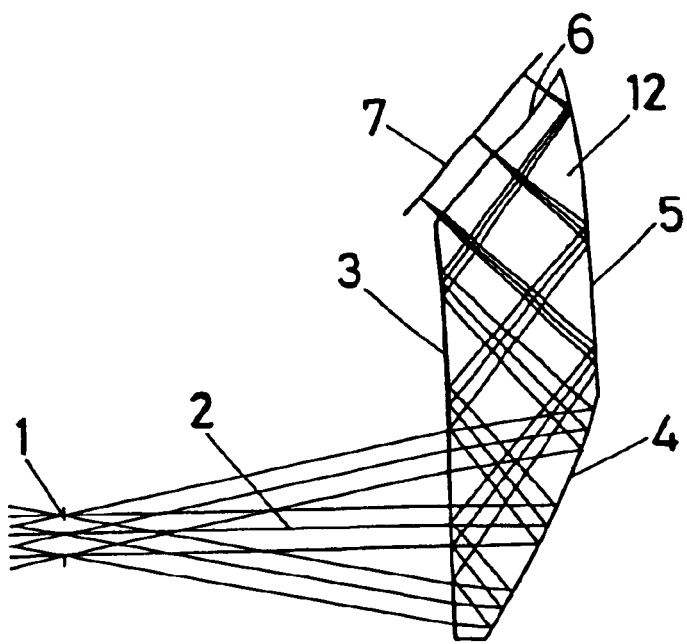
FIG. 2 is a sectional view of an optical system for a single eye of a head-mounted image display apparatus which uses an ocular optical system according to Example 2 of the present invention.
Figure 3:
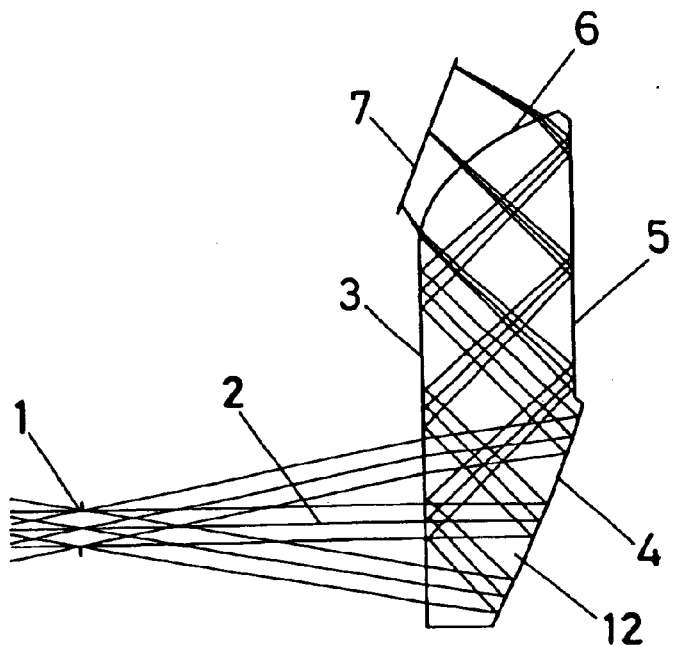
FIG. 3 is a sectional view of an optical system for a single eye of a head-mounted image display apparatus which uses an ocular optical system according to Example 3 of the present invention.
Figure 4:
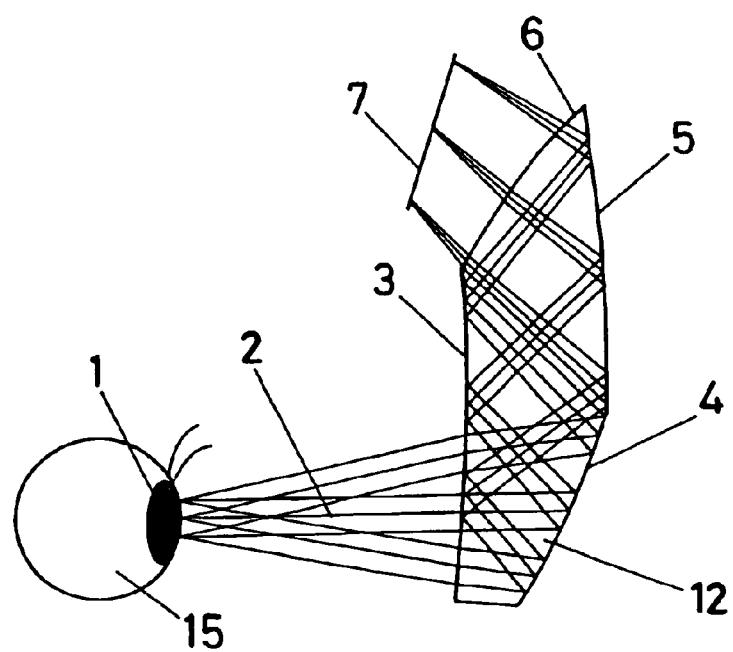
FIG. 4 is a sectional view of an optical system for a single eye of a head-mounted image display apparatus which uses an ocular optical system according to Example 4 of the present invention.

Examples 1 to 17 of the image display apparatus according to the present invention will be described below.

In constituent parameters of each example (described later), as shown typically in FIG. 1, an exit pupil 1 of an ocular optical system 12 is defined as the origin of the optical system, and an optical axis 2 is defined by a light ray passing through both the center of the display area of an image display device 7 and the center(the origin) of the exit pupil 1. A Z-axis is taken in a direction in which light rays travel from the exit pupil 1 along the optical axis 2. A Y-axis is taken in a direction extending through the center of the exit pupil 1 at right angles to the Z-axis in a plane in which light rays are bent by the ocular optical system 12. An X-axis is taken in a direction extending through the center of the exit pupil 1 at right angles to both the Z- and Y-axes. A direction in which the Z-axis extends from the exit pupil 1 toward the ocular optical system 12 is defined as a positive direction of the Z-axis. A direction in which the Y-axis extends from the optical axis 2 toward the image display device 7 is defined as a positive direction of the Y-axis. A direction in which the X-axis constitutes a right-handed system in combination with the Z- and Y-axes is defined as a positive direction of the X-axis. It should be noted that ray tracing is carried out by backward tracing from the exit pupil 1 of the ocular optical system 12, which is defined as the object side, toward the image display device 7, which is defined as the image plane side.

Regarding each surface for which displacements Y and Z and tilt angle θ are shown, the displacement Y is a distance by which the surface is displaced in the Y-axis direction from the exit pupil 1, which is the origin of the optical system, while the displacement Z is a distance by which the surface is displaced in the Z-axis direction from the exit pupil 1, and the tilt angle θ is an angle of inclination of the center axis of the surface with respect to the Z-axis unless otherwise specified in the constituent data (specified in Examples 6 and 9). It should be noted that, for the tilt angle, the counterclockwise direction is defined as a positive direction. In a case where a reference surface is particularly specified, displacements and tilt angle are similarly given with respect to the vertex of the reference surface.

In the constituent parameters (shown later), the surface separation in the coaxial portion is shown as the distance from the surface concerned to the next surface. In addition, the radius of curvature of each spherical surface, refractive index of each medium, and Abbe's number are given according to the conventional method.

FIGS. 1 to 4 and 5(b) to 17 are sectional views of image display apparatuses according to Examples 1 to 4 and 5 to 17 of the present invention, taken along a plane containing the optical axis. In the examples shown in FIGS. 1 to 4, 5(b) to 11, 15 and 16, the image display apparatuses each comprise a decentered prism 12 in which a space formed by four surfaces 3, 4, 5 and 6 which are decentered with respect to the optical axis is filled with a medium having a refractive index larger than 1. In the example shown in FIG. 17, the image display apparatus comprises a decentered prism 12 in which a space formed by three surfaces 3, 4 and 6 which are decentered with respect to the optical axis is filled with a medium having a refractive index larger than 1. In each figure, reference numeral 1 denotes an observer's pupil; 2 denotes an observer's visual axis; 3 denotes a first surface of an ocular optical system 12; 4 denotes a second surface of the ocular optical system 12; 5 denotes a third surface of the ocular optical system 12; 6 denotes a fourth surface of the ocular optical system 12; 7 denotes an image display device; 8 denotes a Fresnel; 9 denotes a line-of-sight detecting optical system; 10 denotes a line-of-sight detector; 11 denotes an illuminating device; 12 denotes an ocular optical system (decentered prism); 13 and 14 denote second optical elements; 15 denotes an observer's eyeball; 16 denotes an optical filter; 17 denotes a linear motor; 18 denotes projections provided on an optical element; and 19 denotes a guide (rail) provided on a casing. In the examples shown in FIGS. 1 to 4, 5(b) to 11, 15 and 16, the actual path of light rays during the observation of the electronic image is as follows: Light rays emitted from the electronic image of the image display device 7 enter the ocular optical system 12 through the fourth surface 6, which is a refracting surface disposed to face the image display device 7. The incident light rays are reflected toward the observer's pupil 1 by the third surface 5, which is adjacent to the fourth surface 6 in the group of two surfaces 4 and 5 located on the side of the ocular optical system 12 that is remote from the observer's face. The reflected light rays are reflected so as to travel away from the observer's pupil 1 by the first surface 3, which is disposed immediately in front of the observer's pupil 1. Then, the reflected light rays are reflected toward the observer's pupil 1 by the second surface 4, which is disposed immediately in front of the observer's pupil 1 in the group of two surfaces 4 and 5 located on the side of the ocular optical system 12 that is remote from the observer's face. The reflected light rays pass through the first surface 3 and are projected into the observer's eyeball 15 with the observer's iris position or eyeball rolling center as an exit pupil 1. In Example 17 shown in FIG. 17, light rays emitted from the electronic image of the image display device 7 enter the ocular optical system 12 through the fourth surface 6, which is a refracting surface disposed to face the image display device 7. The incident light rays are reflected toward the observer's pupil 1 by that region (third surface 5) of the second surface 4 which is adjacent to the fourth surface 6. The second surface 4 also serves as the third surface 5, which is located on the side of the ocular optical system 12 that is remote from the observer's face. The reflected light rays are reflected so as to travel away from the observer's pupil 1 by the first surface 3, which is disposed immediately in front of the observer's pupil 1. Then, the reflected light rays are reflected toward the observer's pupil 1 by that region of the second surface 4 which is remote from the fourth surface 6 and located on the side of the ocular optical system 12 that is remote from the observer's face. The reflected light rays pass through the first surface 3 and are projected into the observer's eyeball 15 with the observer's iris position or eyeball rolling center as an exit pupil 1.

Figure 5A:
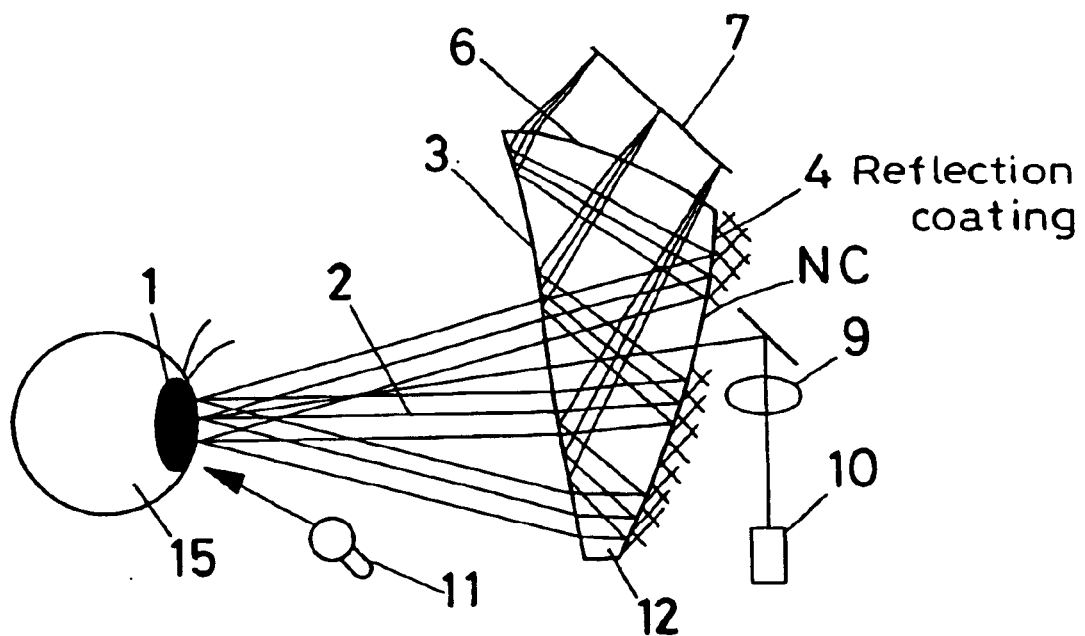
Figure 5B:
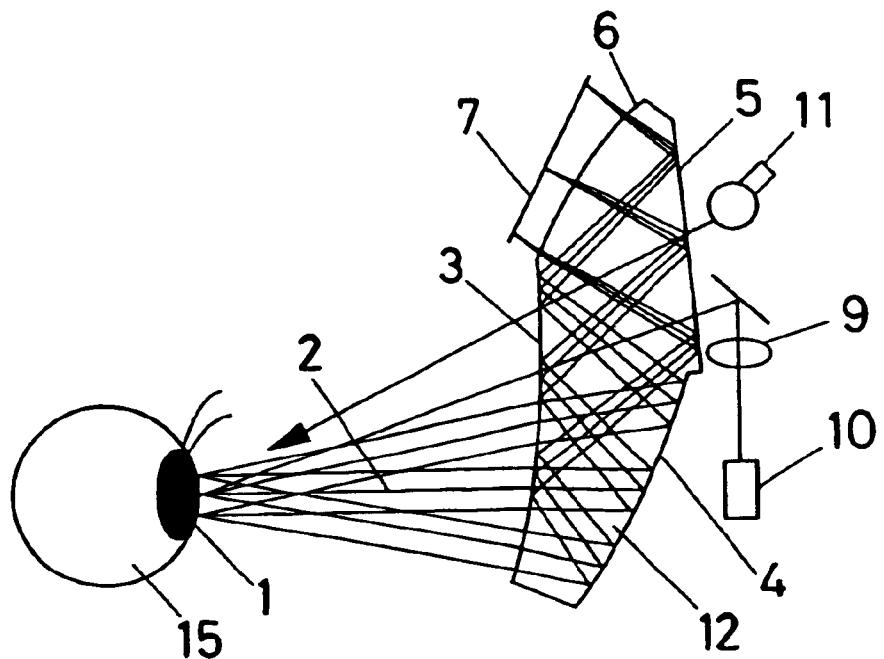
Figure 6:
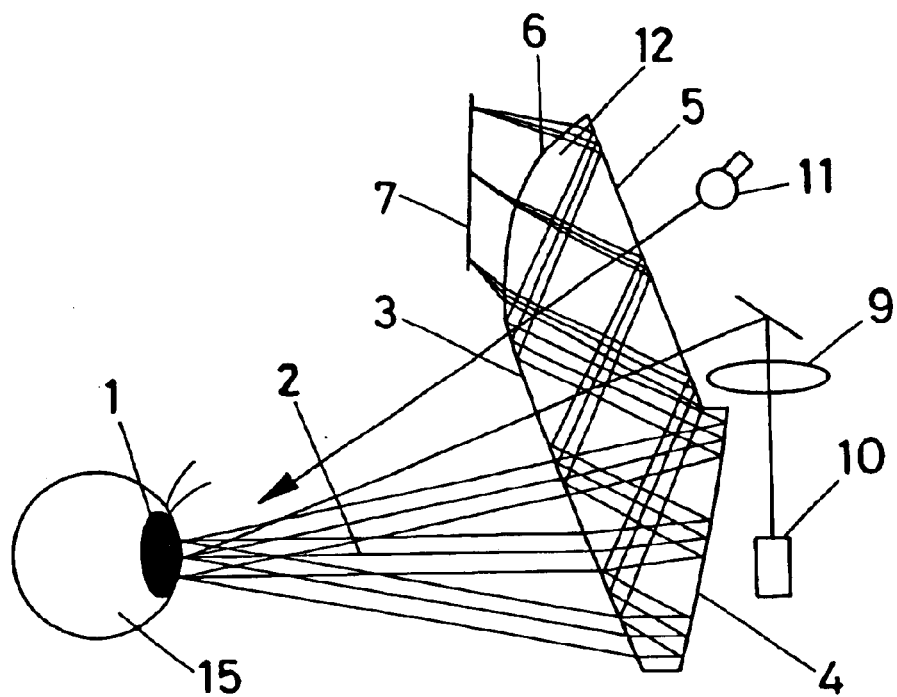
FIG. 6 is a sectional view of an optical system for a single eye of a head-mounted image display apparatus which uses an ocular optical system according to Example 6 of the present invention.

FIGS. 5(b) and 6 show examples of an image display apparatus according to the present invention that has a line-of-sight detecting device. The third surface 5, which is a reflecting surface disposed on the outside world side of the ocular optical system 12, is set so that a part of the third surface 5 totally reflects light rays. The totally reflecting portion of the third surface 5 can reflect light from the image display device 7 without reflection coating. Therefore, no reflection coating is needed. The actual path of light rays during the detection of the observer's line of sight is as follows: Illuminating light from the light source 11 passes through the third and first surfaces 5 and 3 of the ocular optical system 12 to illuminate the observer's eyeball 15. Light rays reflected from the observer's eyeball 15 enter the ocular optical system 12 through the first surface 3, which is disposed immediately in front of the observer's pupil 1. The light rays pass through a totally reflecting region provided in at least a part of the third surface 5, which is located on the side of the ocular optical system 12 that is remote from the observer's face. The light rays passing through the totally reflecting region of the third surface 5 are led to the line-of-sight detector 10 through the line-of-sight detecting optical system 9 to form an image of the observer's pupil 1.

To reduce the effect of light from the electronic image or the like, it is possible to use an infrared light illuminating device as the light source 11 and an infrared light detector as the line-of-sight detector 10. The position of the illuminating device 11 is not necessarily limited to the illustrated position. The illuminating device 11 may be disposed at any position, provided that the observer's eyeball 15 can be illuminated.

Figure 18:
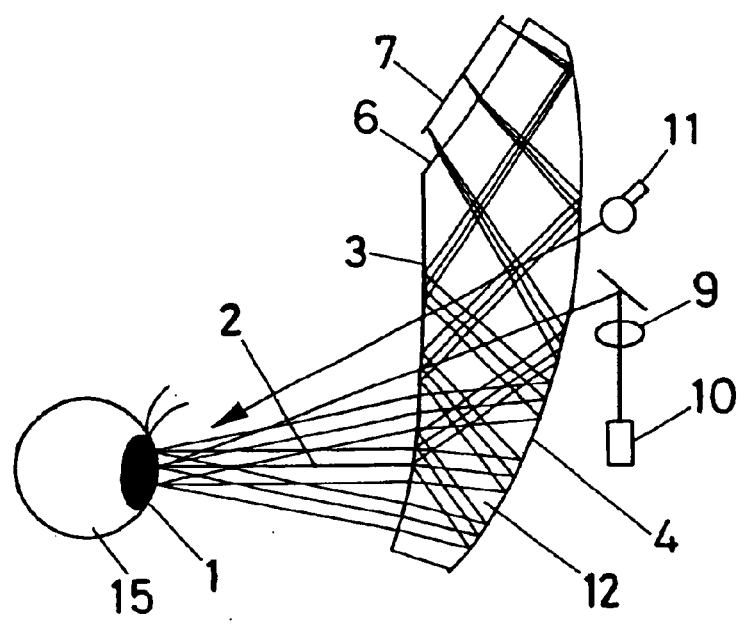
FIG. 18 is a sectional view of an ocular optical system arranged as in Example 17, which is provided with a line-of-sight detecting device.

FIG. 18 is a sectional view of an arrangement in which a line-of-sight detecting device similar to the above, which comprises a line-of-sight detecting optical system 9, a line-of-sight detector 10, and a light source 11, is provided in an ocular optical system 12 comprising three surfaces 3, 4 and 6 decentered with respect to the optical axis as in Example 17. The actual path of light rays during the detection of the observer's line of sight is similar to that in the case of FIGS. 5(b) and 6; therefore, a description thereof is omitted.

Figure 7:
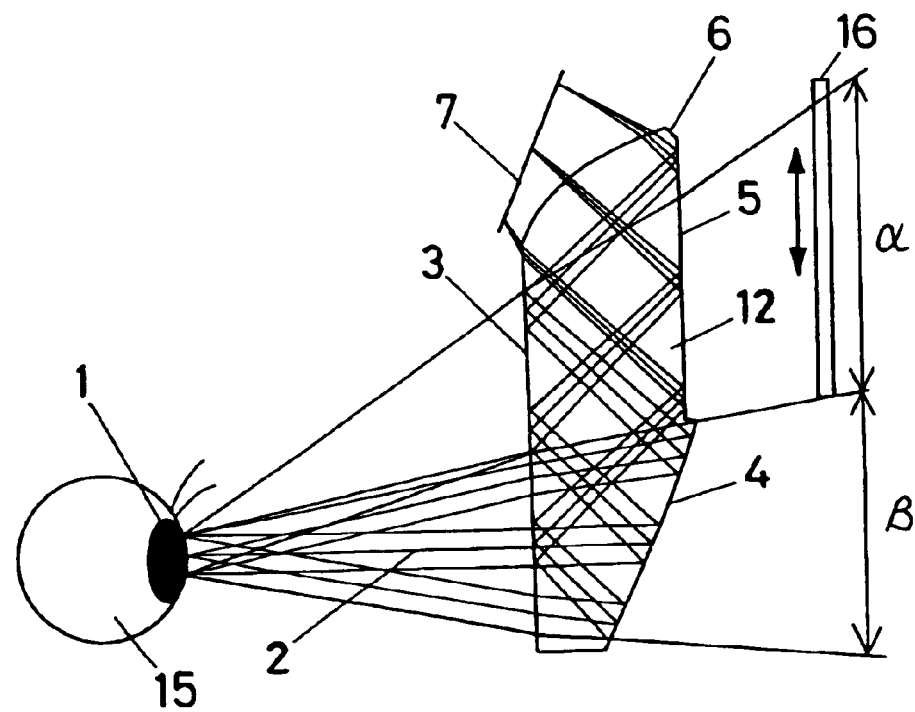
FIG. 7 is a sectional view of an optical system for a single eye of a head-mounted image display apparatus which uses an ocular optical system according to Example 7 of the present invention.

FIG. 7 shows an example of an image display apparatus according to the present invention that enables the electronic image and the external-scene image to be simultaneously observed through the ocular optical system 12. The actual path of light rays during the observation of the external-scene image is as follows: Light rays from an object point in the external scene enter the ocular optical system 12 through the third surface 5, pass through the first surface 3 and are projected into the observer's eyeball 15 with the observer's iris position or eyeball rolling center as an exit pupil 1. It may be made easy for the observer to view either or both of the electronic image and the external-scene image by disposing a light-reducing filter or optical element 16 that controls the quantity of external light at the outside world side of the third surface 5. By moving the light-reducing filter or optical element 16 between the observation ranges α and β, it is possible to control the quantity of light from either of the electronic image and the external-scene image.

FIGS. 8(a), 8(b) and 8(c) and FIGS. 9(a), 9(b) and 9(c) show examples of another image display apparatus according to the present invention that enables the external-scene image to be observed by moving the ocular optical system 12. In the example shown in FIGS. 8(a), 8(b) and 8(c), the ocular optical system 12 is moved from the electronic image observation position shown in FIG. 8(a) in the negative direction of the Y-axis relative to the observer's pupil 1 to reach the external-scene image observation position shown in FIG. 8(b). In the example shown in FIGS. 9(a), 9(b) and 9(c), the ocular optical system 12 is rotated clockwise relative to the observer's pupil 1 from the electronic image observation position shown in FIG. 9(a) to reach the external-scene image observation position shown in FIG. 9(b). Therefore, in either case, the external scene can be observed in the direction of the observer's visual axis. Light rays from an object point in the external scene enter the ocular optical system 12 through the third surface 5, pass through the first surface 3 and are projected into the observer's eyeball with the observer's iris position or eyeball rolling center as an exit pupil 1. In the position shown in FIG. 8(b), the observer can view the electronic image in a region below the observer's visual axis 2. The direction of observation of the electronic image differs depending on the way in which the ocular optical system 12 is disposed and the direction in which the ocular optical system 12 is moved. Therefore, the observation of the electronic image may be performed in any direction.

Figure 9A:
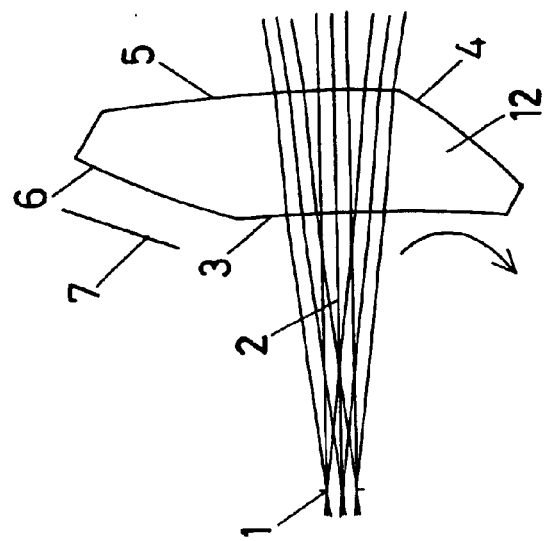
FIGS. 9(a), 9(b) and 9(c) are sectional views of an optical system for a single eye of a head-mounted image display apparatus which uses an ocular optical system according to Example 9 of the present invention.
Figure 9B:
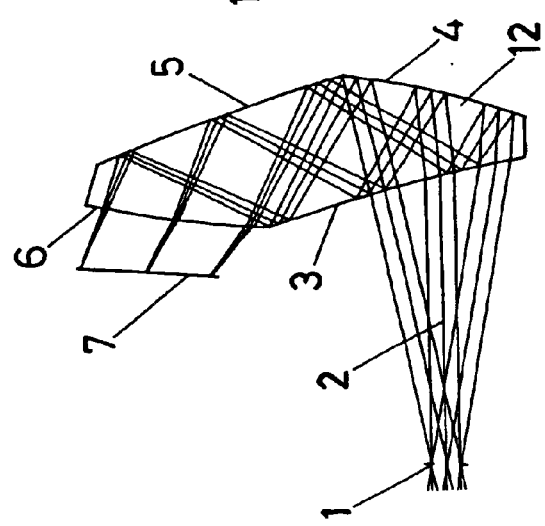
Figure 9C:
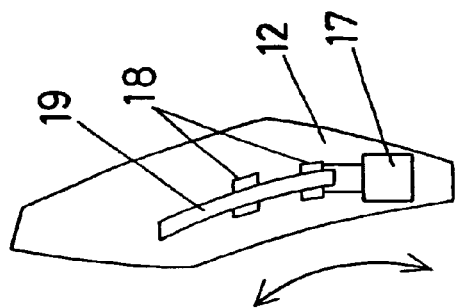

FIGS. 8(c) and 9(c) show examples of a mechanism for moving the ocular optical system 12. In either case, the ocular optical system 12 is moved along a guide (rail) 19 provided on the casing by a linear motor 17 through projections 18 provided on the optical element. In the case of FIG. 8(c), the guide (rail) 19 is rectilinear. Therefore, the ocular optical system 12 is moved rectilinearly. In the case of FIG. 9(c), the guide (rail) 19 is arcuate. Therefore, the ocular optical system 12 is rotated.

FIGS. 19(a), 19(b) and 19(c) show an example in which an ocular optical system 12 comprising three surfaces 3, 4 and 5 decentered with respect to the optical axis as in Example 17 is moved from the electronic image observation position in the negative direction of the Y-axis relative to the observer's pupil 1 to reach the external-scene image observation position as in the case of the example shown in FIGS. 8(a), 8(b) and 8(c). The operation of this example is similar to that of the example shown in FIGS. 8(a), 8(b) and 8(c). Therefore, a description thereof is omitted.

FIGS. 10 to 14 show examples of an image display apparatus according to the present invention in which a Fresnel lens 8 serving as an aberration correcting device is disposed in an optical path for observation of the external-scene image. The actual path of light rays during the observation of the external-scene image is as follows: Light rays from an object point in the external scene pass through the Fresnel lens 8 and enter the decentered prism 12 through the second surface 4. Then, the light rays pass through the first surface 3 and are projected into the observer's eyeball with the observer's iris position or eyeball rolling center as an exit pupil 1. In this arrangement, the Fresnel lens 8 is only necessary to dispose at a predetermined position when the external scene is observed. When the observer does not want to view the external scene, the Fresnel lens 8 is moved to another position by a moving mechanism, e.g. a mechanism for moving the Fresnel lens 8 vertically, or a mechanism for rotating the Fresnel lens 8. Alternatively, the Fresnel lens 8 may be arranged to be detachable.

Figure 10:
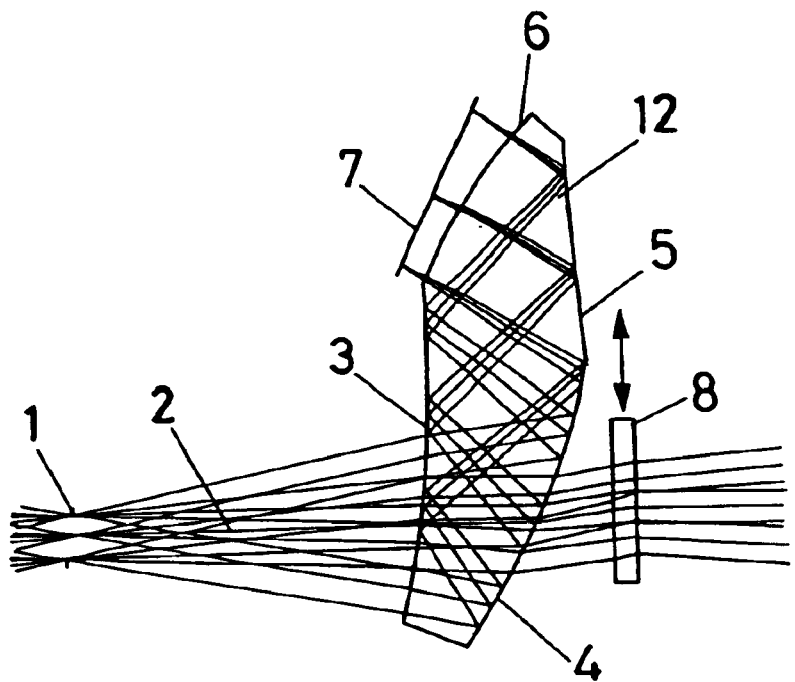
FIG. 10 is a sectional view of an optical system for a single eye of a head-mounted image display apparatus which uses an ocular optical system according to Example 10 of the present invention.
Figure 11:
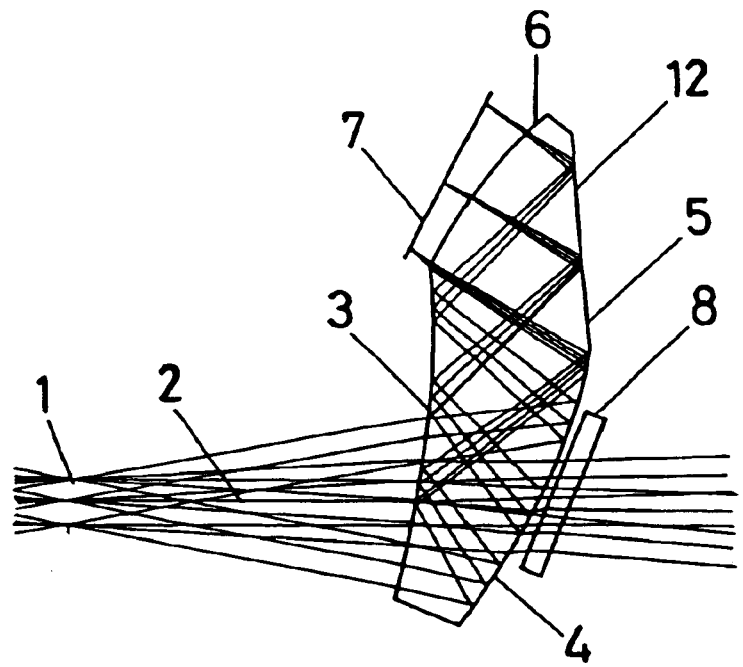
FIG. 11 is a sectional view of an optical system for a single eye of a head-mounted image display apparatus which uses an ocular optical system according to Example 11 of the present invention.
Figure 12:
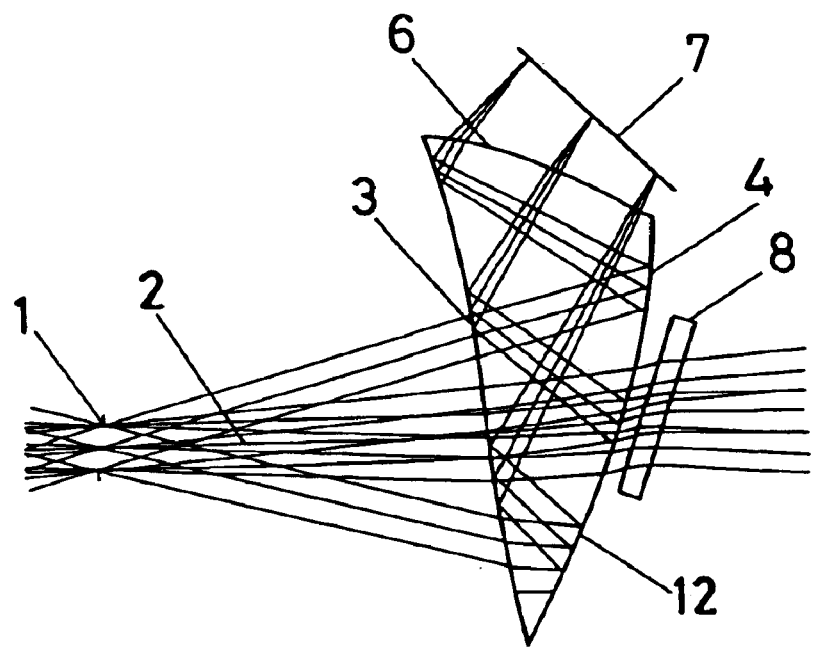
FIG. 12 is a sectional view of an optical system for a single eye of a head-mounted image display apparatus which uses an ocular optical system according to Example 12 of the present invention.

In the examples shown in FIGS. 10 to 14, those which are shown in FIGS. 10 and 11 are arranged as in the case of FIG. 1. That is, the ocular optical system (decentered prism) 12 comprises four surfaces 3, 4, 5 and 6 decentered with respect to the optical axis, and when the electronic image is observed, light rays travel along the same path as in the case of FIG. 1. However, the ocular optical system shown in FIG. 12 comprises a decentered prism 12 in which a space formed by three surfaces 3, 4 and 6 decentered with respect to the optical axis is filled with a medium having a refractive index larger than 1. The actual path of light rays during the observation of the electronic image is as follows: Light rays emitted from the electronic image of the image display device 7 enter the ocular optical system 12 through the fourth surface (the third surface as counted in the sequence of surfaces) 6, which is a refracting surface disposed to face the image display device 7. The incident light rays are reflected so as to travel away from the observer's pupil 1 by the first surface 3, which is disposed immediately in front of the observer's pupil 1. The reflected light rays are reflected toward the observer's pupil 1 by the second surface 4, which is disposed on the side of the ocular optical prism 12 that is remote from the observer's face. Then, the reflected light rays pass through the first surface 3 and are projected into the observer's eyeball 15 with the observer's iris position or eyeball rolling center as an exit pupil 1.

Figure 13:
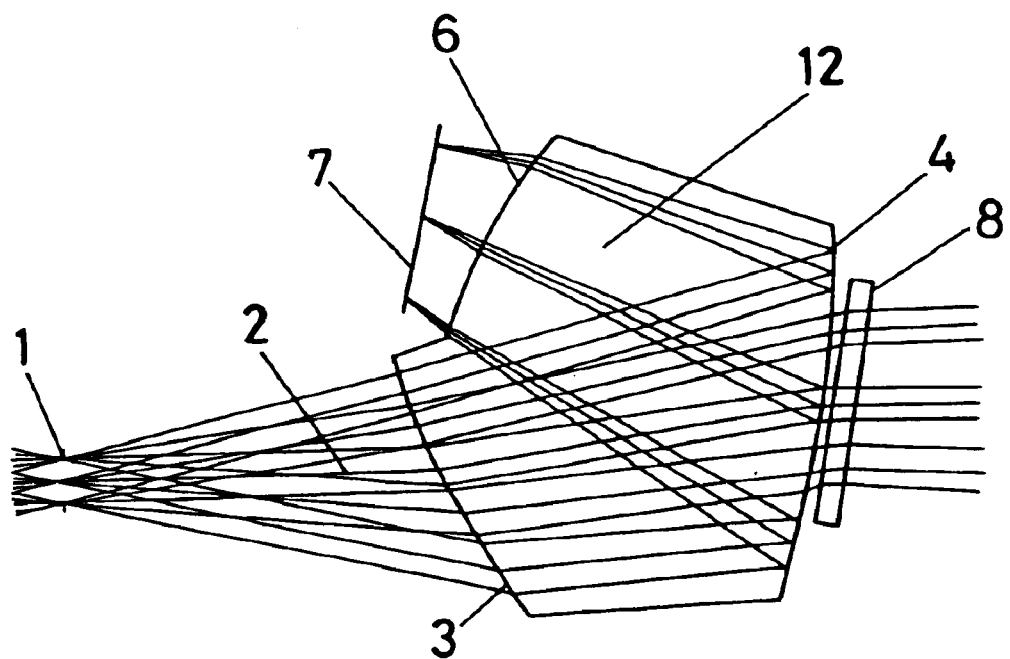
FIG. 13 is a sectional view of an optical system for a single eye of a head-mounted image display apparatus which uses an ocular optical system according to Example 13 of the present invention.

The ocular optical system shown in FIG. 13 comprises a decentered prism 12 in which a space formed by three surfaces 3, 4 and 6 decentered with respect to the optical axis is filled with a medium having a refractive index larger than 1. The actual path of light rays during the observation of the electronic image is as follows: Light rays emitted from the electronic image of the image display device 7 enter the ocular optical system 12 through the fourth surface (the third surface as counted in the sequence of surfaces) 6, which is a refracting surface disposed to face the image display device 7. The incident light rays are reflected toward the observer's pupil 1 by the second surface 4, which is disposed on the side of the ocular optical system 12 that is remote from the observer's face. The reflected light rays pass through the first surface 3 and are projected into the observer's eyeball 15 with the observer's iris position or eyeball rolling center as an exit pupil 1.

Figure 14:
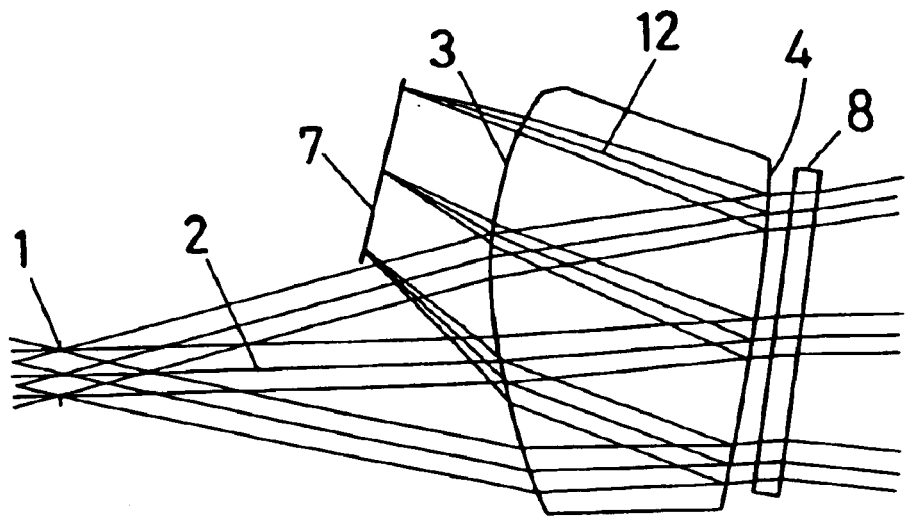
FIG. 14 is a sectional view of an optical system for a single eye of a head-mounted image display apparatus which uses an ocular optical system according to Example 14 of the present invention.

The ocular optical system 12 shown in FIG. 14 comprises a decentered prism 12 in which a space formed by two surfaces 3 and 4 decentered with respect to the optical axis is filled with a medium having a refractive index larger than 1. The actual path of light rays during the observation of the electronic image is as follows: Light rays emitted from the electronic image of the image display device 7 enter the ocular optical system 12 through the first surface 3, which is a refracting surface disposed to face the image display device 7. The incident light rays are reflected toward the observer's pupil 1 by the second surface 4, which is located on the side of the ocular optical system 12 that is remote from the observer's face. The reflected light rays pass through the first surface 3 and are projected into the observer's eyeball 15 with the observer's iris position or eyeball rolling center as an exit pupil 1.

Figure 15:
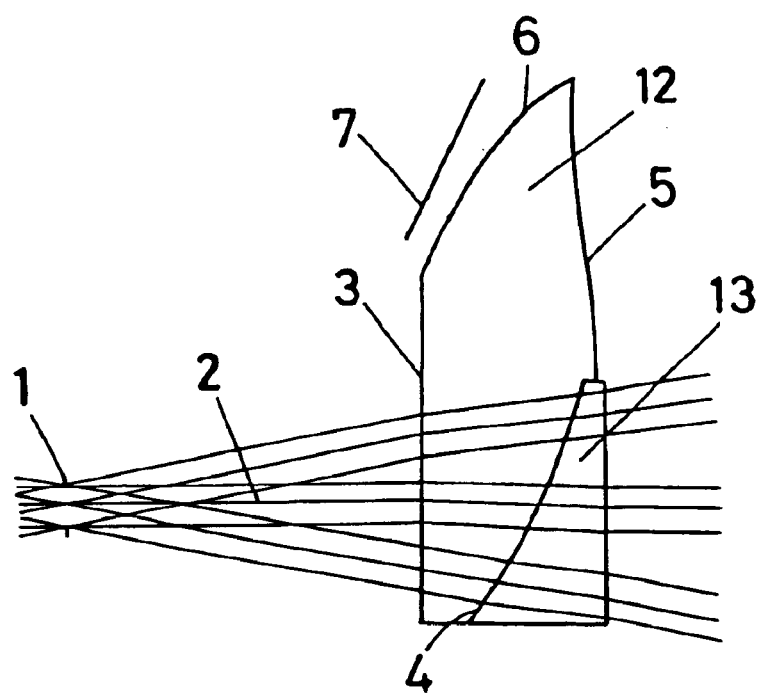
FIG. 15 is a sectional view of an optical system for a single eye of a head-mounted image display apparatus which uses an ocular optical system according to Example 15 of the present invention.
Figure 16:
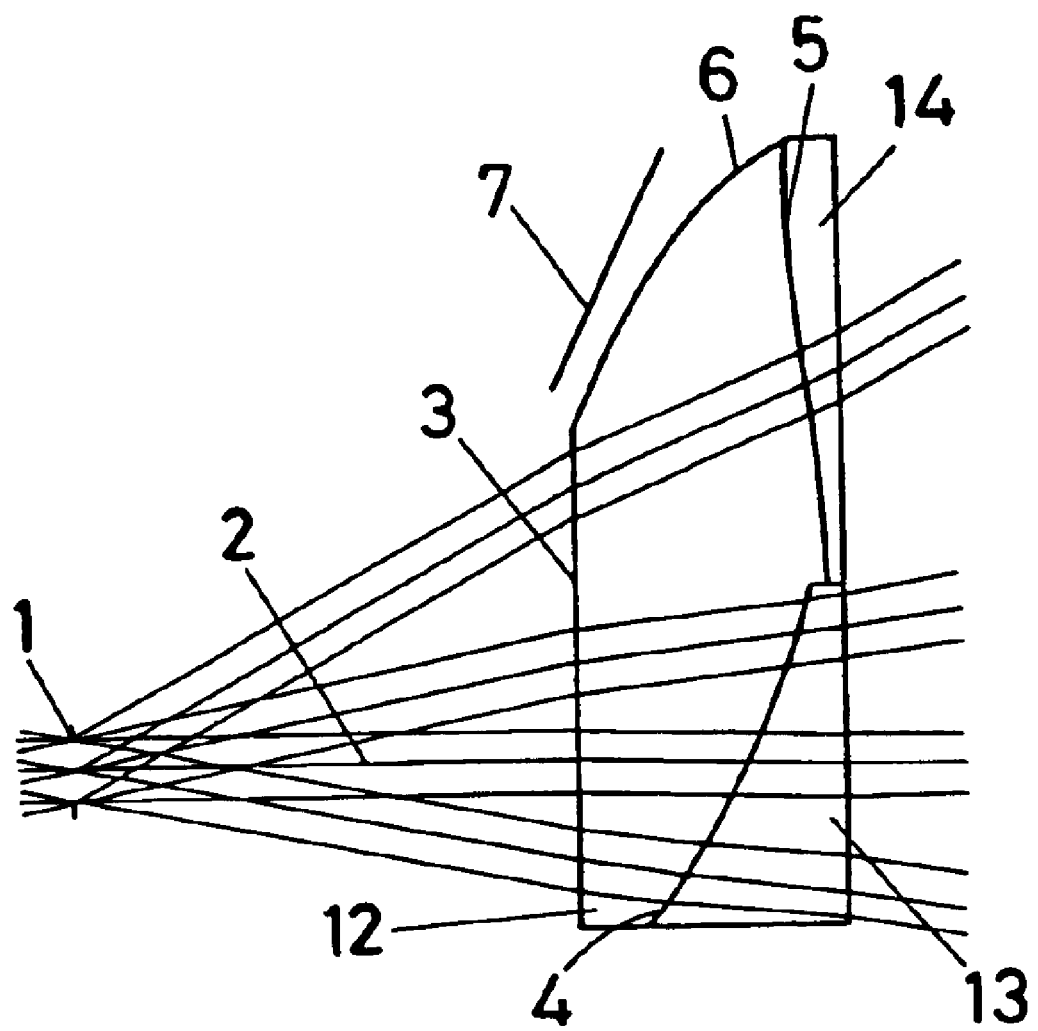
FIG. 16 is a sectional view of an optical system for a single eye of a head-mounted image display apparatus which uses an ocular optical system according to Example 16 of the present invention.
Figure 17:
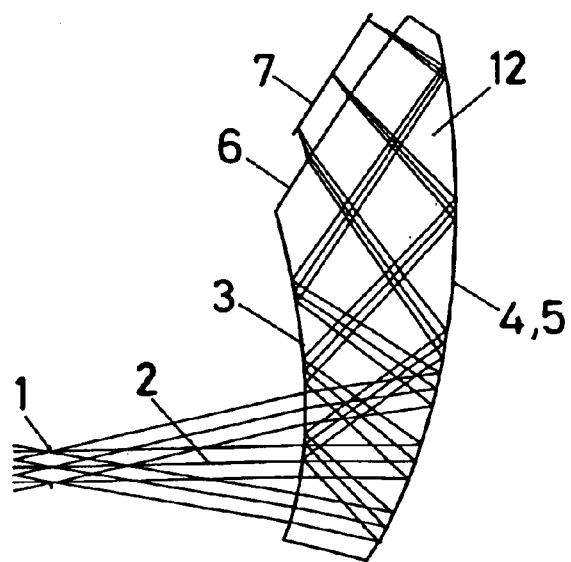
FIG. 17 is a sectional view of an optical system for a single eye of a head-mounted image display apparatus which uses an ocular optical system according to Example 17 of the present invention.

FIGS. 15 and 16 show examples of an image display apparatus according to the present invention which is adapted to observe the external scene through the first surface 3 of the ocular optical system 12, which is located immediately in front of the observer's eyeball, and further through either of the second and third surfaces 4 and 5 of the ocular optical system 12, which are outside world-side internally reflecting surfaces. When the external scene is to be observed, second optical elements 13 and 14, which are adapted to cancel powers produced by the two surfaces 3 and 4 or 3 and 5 with respect to external light, are disposed in the optical paths for observation of the external-scene image. The actual path of light rays during the observation of the external-scene image is as follows: Light rays from an object point in the external scene pass through a second optical element 13 or another second optical element 14 and enter the decentered prism 12 through the second surface 4 or the third surface 5. Then, the light rays pass through the first surface 3 and are projected into the observer's eyeball 15 with the observer's iris position or eyeball rolling center as an exit pupil 1.

It should be noted that the present invention is not necessarily limited to the optical systems shown in FIGS. 1 to 4 and 5(b) to 19 but may also be applied to other known optical systems.

In the constituent parameters of each of the following examples, the rotationally symmetric aspherical configuration of each surface may be given by the following equation on the assumption that the paraxial curvature A radius is denoted by R. The Z-axis is the axis of the rotationally symmetric aspherical surface.

$$Z=(h^2/R)/[1+\{1-(1+K)(h^2/R^2)\}^{1/2}]$$
$$+Ah^4+Bh^6+Ch^8+Dh^{10}\ldots$$
$$(h^2 32 x^2+y^2) \tag{a}$$

where Z is the amount of deviation from a plane tangent to the origin of the surface configuration; K is the conical coefficient; and A, B, C and D are 4th-, 6th-, 8th- and 10th-order aspherical coefficients, respectively.

The configuration of an anamorphic surface is defined by the following equation. A straight line which passes through the origin of the surface configuration and which is perpendicular to the optical surface is defined as the axis of the anamorphic surface.

$$Z = (CX \cdot x^2 + CY \cdot y^2)/\left[1 + \{1 - (1+K_x)CX^2 \cdot x^2 - (1+K_y)CY^2 \cdot y^2\}^{1/2}\right] + \sum_{m=1} R_m\{(1-P_m)x^2 + (1+P_m)y^2\}^{m+1}$$

Assuming that m=4 (polynomial of degree 4), for example, the equation, when expanded, may be given by:

$$Z=(CX \cdot x^2+CY \cdot y^2)/[1+\{1-(1+K_x)CX^2 \cdot x^2$$

$$-(1+K_y)CY^2 \cdot y^2\}^{1/2}]$$

$$+R_1\{(1-P_1)x^2+(1+P_1)y^2\}^2$$

$$+R_2\{(1-P_2)x^2+(1+P_2)y^2\}^3$$

$$+R_3\{(1-P_3)x^2+(1+P_3)y^2\}^4$$

$$+R_4\{(1-P_4)x^2+(1+P_4)y^2\}^5 \quad \text{(b)}$$

where Z is the amount of deviation from a plane tangent to the origin of the surface configuration; CX is the curvature in the X-axis direction; CY is the curvature in the Y-axis direction; $K_x$ is the conical coefficient in the X-axis direction; $K_y$ is the conical coefficient in the Y-axis direction; $R_m$ is the rotationally symmetric component of the aspherical surface term; and $P_m$ is the rotationally asymmetric component of the aspherical surface term. It should be noted that in the constituent parameters of the examples (described later), the following parameters are employed:

$R_x$: the radius of curvature in the X-axis direction $R_y$: the radius of curvature in the Y-axis direction The curvature radii are related to the curvatures CX and CY as follows:

$$R_x=1/CX,$$

$$R_y=1/CY$$

The configuration of a three-dimensional surface is defined by the following equation. The Z-axis of the defining equation is the axis of the three-dimensional surface.

$$Z = \sum_{n=0}^{k} \sum_{m=k}^{n} C_{nm} X^n Y^{n-m}$$

Assuming that k=7 (polynomial of degree 7), for example, a three-dimensional surface is expressed by an expanded form of the above equation as follows:

$$Z = C_2 + C_3Y + C_4X + C_5Y^2 + C_6YX + C_7X^2 + \quad \text{(c)}$$

$$C_8Y^3 + C_9Y^2X + C_{10}YX^2 + C_{11}X^3 +$$

$$C_{12}Y^4 + C_{13}Y^3X + C_{14}Y^2X^2 + C_{15}YX^3 + C_{16}X^4 +$$

$$C_{17}Y^5 + C_{18}Y^4X + C_{19}Y^3X^2 + C_{20}Y^2X^3 + C_{21}YX^4 +$$

$$C_{22}X^5 + C_{23}Y^6 + C_{24}Y^5X + C_{25}Y^4X^2 + C_{26}Y^3X^3 +$$

$$C_{27}Y^2X^4 + C_{28}YX^5 + C_{29}X^6 + C_{30}Y^7 + C_{31}Y^6X +$$

$$C_{32}Y^5X^2 + C_{33}Y^4X^3 + C_{34}Y^3X^4 + C_{35}Y^2X^5 +$$

$$C_{36}YX^6 + C_{37}X^7$$

In the examples of the present invention, each ocular optical system is designed as an optical system symmetric with respect to the X-axis direction. Therefore, the coefficients of the terms with odd-numbered powers of X are set equal to zero [in the above equation (c), $C_4, C_6, C_g, \ldots =0$].

In the constituent parameters(shown later), those terms concerning aspherical surfaces for which no data is shown are zero. The refractive index is expressed by the refractive index for the spectral d-line (wavelength: 587.56 nanometers). Lengths are given in millimeters.

FIGS. 1 to 4 and 5(b) to 17 are sectional views of Examples 1 to 4 and 5 to 17 taken along the YZ-plane containing the optical axis 2. In Examples 1 to 11, 13 and 14, the observation field angles are as follows: The horizontal field angle is 30.0°, and the vertical field angle is 22.72°. In Example 12, the observation field angles are as follows: The horizontal field angle is 40.0°, and the vertical field angle is 30.53°. In Examples 15 and 16, the observation field angles are as follows: The horizontal field angle is 35.0°, and the vertical field angle is 26.60°. In Examples 1 to 16, the pupil diameter is 4 millimeters.

The constituent parameters and the values of the conditions in the above-described Examples 1 to 6, 9 to 14 and 17 are shown below. The constituent parameters of Examples 7 and 8 are the same as those of Example 3; therefore, a description thereof is omitted. The constituent parameters of Examples 10 and 11 during the observation of the image display device are the same as those of Example 5. Therefore, the constituent parameters during the observation of the external scene are shown for Examples 10 and 11. The constituent parameters of Example 12 during the observation of the image display device are shown under "Example 12(1)". The constituent parameters of Example 12 during the observation of the external scene are shown under "Example 12(2)". It should be noted that in the table below, "ASPH" denotes an aspherical surface; "ANAM" denotes an anamorphic surface; "SF" denotes a surface; and "REFL" denotes a reflecting surface.

| Surface No. | | Radius of curvature | Surface separation | Refractive index (Displacement) | | Abbe's No. (Tilt angle) | |
|---|---|---|---|---|---|---|---|
| Example 1 | | | | | | | |
| 1 | | ∞(Pupil) | | | | | |
| 2 | ASPH | ∞ | | | | 1.5254 | 56.25 |
| | (1ST SF) | K 0.0000 | | Y | 18.114 | θ | 4.44° |
| | | A 0.0000 | | Z | 37.091 | | |

-continued

| | | | | | | | | |
|---|---|---|---|---|---|---|---|---|
| | | B | 0.0000 | | | | | |
| | | C | $1.1599 \times 10^{-13}$ | | | | | |
| | | D | $4.4930 \times 10^{-16}$ | | | | | |
| 3 | ANAM | $R_y$ | −142.541 | | 1.5254 | | 56.25 | |
| | (2ND SF) | $R_x$ | −122.057 | Y | 3.041 | θ | −17.79° | |
| | (REFL) | $K_y$ | −5.4587 | Z | 52.132 | | | |
| | | $K_x$ | −0.2658 | | | | | |
| | | $R_1$ | $-5.0900 \times 10^{-10}$ | | | | | |
| | | $R_2$ | $3.0528 \times 10^{-10}$ | | | | | |
| | | $R_3$ | $6.2600 \times 10^{-13}$ | | | | | |
| | | $R_4$ | $4.9434 \times 10^{-15}$ | | | | | |
| | | $P_1$ | $-1.1948 \times 10^{+1}$ | | | | | |
| | | $P_2$ | $2.3791 \times 10^{-1}$ | | | | | |
| | | $P_3$ | $4.8713 \times 10^{-1}$ | | | | | |
| | | $P_4$ | $3.3074 \times 10^{-1}$ | | | | | |
| 4 | ASPH | | ∞ | | 1.5254 | | 56.25 | |
| | (1ST SF) | K | 0.0000 | Y | 18.114 | θ | 4.44° | |
| | (REFL) | A | 0.0000 | Z | 37.091 | | | |
| | | B | 0.0000 | | | | | |
| | | C | $1.1599 \times 10^{-13}$ | | | | | |
| | | D | $4.4930 \times 10^{-16}$ | | | | | |
| 5 | | | ∞ | | 1.5254 | | 56.25 | |
| | (3RD SF) | | | Y | 18.114 | θ | 4.44° | |
| | (REFL) | | | Z | 53.502 | | | |
| 6 | ANAM | $R_y$ | 47.391 | Y | 41.220 | θ | −55.16° | |
| | (4TH SF) | $R_x$ | 86.005 | Z | 47.787 | | | |
| | | $K_y$ | 1.9910 | | | | | |
| | | $K_x$ | −0.1607 | | | | | |
| | | $R_1$ | $1.1694 \times 10^{-7}$ | | | | | |
| | | $R_2$ | $-2.2052 \times 10^{-10}$ | | | | | |
| | | $R_3$ | $-1.8410 \times 10^{-11}$ | | | | | |
| | | $R_4$ | $-4.2076 \times 10^{-14}$ | | | | | |
| | | $P_1$ | −6.2804 | | | | | |
| | | $P_2$ | −4.0710 | | | | | |
| | | $P_3$ | $4.2066 \times 10^{-1}$ | | | | | |
| | | $P_4$ | $5.1697 \times 10^{-1}$ | | | | | |
| 7 | | | ∞ | Y | 40.079 | θ | −25.63° | |
| (Image display plane) | | | | Z | 38.041 | | | |

(1) $\theta_{r3} = 43.85°$
(3) $\phi_{t1}$ (yz) = 0 (1/mm)
$\phi_{t1}$ (xz) = 0 (1/mm)

Example 2

| | | | | | | |
|---|---|---|---|---|---|---|
| 1 | ∞(Pupil) | | | | | |
| 2 | Three-dimensional surface(1) | | 1.5000 | | 55.55 | |
| | (1ST SF) | Y | 8.738 | θ | −0.43° | |
| | | Z | 38.294 | | | |
| 3 | Three-dimensional surface(2) | | 1.5000 | | 55.55 | |
| | (2ND SF) | Y | 0.000 | θ | −26.39° | |
| | (REFL) | Z | 47.232 | | | |
| 4 | Three-dimensional surface(1) | | 1.5000 | | 55.55 | |
| | (1ST SF) | Y | 8.738 | θ | −0.43° | |
| | (REFL) | Z | 38.294 | | | |
| 5 | Three-dimensional surface(3) | | 1.5000 | | 55.55 | |
| | (3RD SF) | Y | 28.900 | θ | 4.00° | |
| | (REFL) | Z | 51.503 | | | |
| 6 | Three-dimensional surface(4) | | 1.5000 | | 55.55 | |
| | (4TH SF) | Y | 37.094 | θ | −42.91° | |
| | | Z | 43.146 | | | |
| 7 | ∞ | Y | 39.222 | θ | −39.45° | |
| (Image display plane) | | Z | 41.032 | | | |

Three-dimensional surface(1)

$C_5$ $-4.3507 \times 10^{-4}$  $C_7$ $-8.3810 \times 10^{-3}$  $C_8$ $-7.2046 \times 10^{-5}$
$C_{10}$ $-1.6070 \times 10^{-4}$  $C_{12}$ $-5.7849 \times 10^{-7}$  $C_{14}$ $-7.6285 \times 10^{-7}$
$C_{16}$ $2.6344 \times 10^{-6}$  $C_{17}$ $-7.4711 \times 10^{-9}$  $C_{19}$ $-1.9337 \times 10^{-8}$
$C_{21}$ $9.3990 \times 10^{-8}$ Three-dimensional surface(2)

$C_5$ $-4.4979 \times 10^{-3}$  $C_7$ $-8.5757 \times 10^{-3}$  $C_8$ $-6.4211 \times 10^{-5}$
$C_{10}$ $-3.1176 \times 10^{-5}$  $C_{12}$ $1.3495 \times 10^{-6}$  $C_{14}$ $4.8979 \times 10^{-8}$
$C_{16}$ $-2.4100 \times 10^{-8}$  $C_{17}$ $-4.2204 \times 10^{-8}$  $C_{19}$ $-3.8212 \times 10^{-8}$
$C_{21}$ $-9.1979 \times 10^{-9}$ Three-dimensional surface(3)

$C_5$ $-4.6997 \times 10^{-4}$  $C_7$ $-3.2125 \times 10^{-3}$  $C_8$ $-8.6078 \times 10^{-5}$
$C_{10}$ $-1.0181 \times 10^{-4}$  $C_{12}$ $-2.7246 \times 10^{-6}$  $C_{14}$ $2.7277 \times 10^{-6}$
$C_{16}$ $3.7002 \times 10^{-6}$  $C_{17}$ $-3.1103 \times 10^{-8}$  $C_{19}$ $1.0092 \times 10^{-8}$
$C_{21}$ $2.0208 \times 10^{-7}$ -continued Three-dimensional surface(4)

$C_5$ $3.6987 \times 10^{-3}$   $C_7$ $8.3763 \times 10^{-3}$   $C_8$ $-8.9771 \times 10^{-4}$
$C_{10}$ $5.0916 \times 10^{-6}$   $C_{12}$ $-5.7678 \times 10^{-5}$   $C_{14}$ $4.5123 \times 10^{-7}$
$C_{16}$ $-2.3865 \times 10^{-6}$
(1) $\theta_{r3} = 48.44°$
(3) $\theta_{t1}$ (yz) = $-0.0037$ (1/mm)
    $\theta_{t1}$ (xz) = $-0.0072$ (1/mm)

Example 3

| | | | | | | | |
|---|---|---|---|---|---|---|---|
| 1 | | ∞(Pupil) | | | | | |
| 2 | | ∞ | | | 1.5254 | | 56.25 |
| | (1ST SF) | | | Y | −27.000 | θ | 0.00° |
| | | | | Z | 37.395 | | |
| 3 | ANAM | $R_y$ −143.929 | | | 1.5254 | | 56.25 |
| | (2ND SF) | $R_x$ −123.293 | | Y | −14.868 | θ | −28.80° |
| | (REFL) | $K_y$ 0.3713 | | Z | 42.871 | | |
| | | $K_x$ −1.9942 | | | | | |
| | | $R_1$ $2.1403 \times 10^{-8}$ | | | | | |
| | | $R_2$ $9.6413 \times 10^{-13}$ | | | | | |
| | | $R_3$ $6.3684 \times 10^{-14}$ | | | | | |
| | | $R_4$ $-1.2452 \times 10^{-17}$ | | | | | |
| | | $P_1$ $-3.9989 \times 10^{-3}$ | | | | | |
| | | $P_2$ −3.0463 | | | | | |
| | | $P_3$ $2.5677 \times 10^{-1}$ | | | | | |
| | | $P_4$ $4.2810 \times 10^{-1}$ | | | | | |
| 4 | | ∞ | | | 1.5254 | | 56.25 |
| | (1ST SF) | | | Y | −27.000 | θ | 0.00° |
| | (REFL) | | | Z | 37.395 | | |
| 5 | | ∞ | | | 1.5254 | | 56.25 |
| | (3RD SF) | | | Y | 0.079 | θ | 0.00° |
| | (REFL) | | | Z | 53.539 | | |
| 6 | ANAM | $R_y$ 39.861 | | Y | 44.498 | θ | −66.77° |
| | (4TH SF) | $R_x$ 62.319 | | Z | 51.066 | | |
| | | $K_y$ 1.5656 | | | | | |
| | | $K_x$ 4.2425 | | | | | |
| | | $R_1$ $3.9064 \times 10^{-6}$ | | | | | |
| | | $R_2$ $5.0520 \times 10^{-10}$ | | | | | |
| | | $R_3$ $4.9921 \times 10^{-13}$ | | | | | |
| | | $R_4$ $-6.6158 \times 10^{-15}$ | | | | | |
| | | $P_1$ $-1.5408 \times 10^{-1}$ | | | | | |
| | | $P_2$ 4.0979 | | | | | |
| | | $P_3$ 1.6631 | | | | | |
| | | $P_4$ 1.0506 | | | | | |
| 7 | | ∞ | | Y | 42.800 | θ | −21.40° |
| | (Image display plane) | | | Z | 38.475 | | |

(1) $\theta r_3 = 44.53°$
(3) $\phi_{t1}$ (yz) = 0 (1/mm)
    $\phi_{t1}$ (xz) = 0 (1/mm)

Example 4

| | | | | | | | |
|---|---|---|---|---|---|---|---|
| 1 | | ∞(Pupil) | | | | | |
| 2 | ANAM | $R_y$ −242.348 | | | 1.5254 | | 56.25 |
| | (1ST SF) | $R_x$ −159.768 | | Y | 5.082 | θ | −3.86° |
| | | $K_y$ 12.1104 | | Z | 32.396 | | |
| | | $K_x$ 4.7358 | | | | | |
| | | $R_1$ $-2.5719 \times 10^{-10}$ | | | | | |
| | | $R_2$ $-4.9792 \times 10^{-12}$ | | | | | |
| | | $R_3$ $8.8695 \times 10^{-13}$ | | | | | |
| | | $R_4$ $6.7191 \times 10^{-20}$ | | | | | |
| | | $P_1$ $-1.8150 \times 10^{+1}$ | | | | | |
| | | $P_2$ −4.7838 | | | | | |
| | | $P_3$ −1.2978 | | | | | |
| | | $P_4$ −7.1284 | | | | | |
| 3 | ANAM | $R_y$ −119.562 | | | 1.5254 | | 56.25 |
| | (2ND SF) | $R_x$ −98.451 | | Y | 27.149 | θ | −11.26° |
| | (REFL) | $K_y$ −0.1186 | | Z | 52.500 | | |
| | | $K_x$ 0.7866 | | | | | |
| | | $R_1$ $-1.6969 \times 10^{-9}$ | | | | | |
| | | $R_2$ $-6.2266 \times 10^{-11}$ | | | | | |
| | | $R_3$ $8.5459 \times 10^{-16}$ | | | | | |
| | | $R_4$ $8.0998 \times 10^{-16}$ | | | | | |
| | | $P_1$ −1.8331 | | | | | |
| | | $P_2$ $-4.9789 \times 10^{-1}$ | | | | | |
| | | $P_3$ −2.3604 | | | | | |
| | | $P_4$ $-9.6450 \times 10^{-1}$ | | | | | |
| 4 | ANAM | $R_y$ −242.348 | | | 1.5254 | | 56.25 |
| | (1ST SF) | $R_x$ −159.768 | | Y | 5.082 | θ | −3.86° |
| | (REFL) | $K_y$ 12.1104 | | Z | 32.396 | | |

-continued

|   |   |   |   |   |   |   |   |
|---|---|---|---|---|---|---|---|
|   |   | $K_x$ 4.7358 |   |   |   |   |   |
|   |   | $R_1$ $-2.5719 \times 10^{-10}$ |   |   |   |   |   |
|   |   | $R_2$ $-4.9792 \times 10^{-12}$ |   |   |   |   |   |
|   |   | $R_3$ $8.8695 \times 10^{-13}$ |   |   |   |   |   |
|   |   | $R_4$ $6.7191 \times 10^{-20}$ |   |   |   |   |   |
|   |   | $P_1$ $-1.8150 \times 10^{+1}$ |   |   |   |   |   |
|   |   | $P_2$ $-4.7838$ |   |   |   |   |   |
|   |   | $P_3$ $-1.2978$ |   |   |   |   |   |
|   |   | $P_4$ $-7.1284$ |   |   |   |   |   |
| 5 | ANAM | $R_y$ $-179.007$ |   |   | 1.5254 |   | 56.25 |
|   | (3RD SF) | $R_x$ $-231.111$ | Y | 27.820 | $\theta$ | 1.74° |
|   | (REFL) | $K_y$ 2.2288 | Z | 47.835 |   |   |   |
|   |   | $K_x$ $-72.7188$ |   |   |   |   |   |
|   |   | $R_1$ $6.1912 \times 10^{-8}$ |   |   |   |   |   |
|   |   | $R_2$ $-9.4470 \times 10^{-13}$ |   |   |   |   |   |
|   |   | $R_3$ $2.8064 \times 10^{-15}$ |   |   |   |   |   |
|   |   | $R_4$ $2.0069 \times 10^{-18}$ |   |   |   |   |   |
|   |   | $P_1$ $2.0705 \times 10^{-2}$ |   |   |   |   |   |
|   |   | $P_2$ 6.7667 |   |   |   |   |   |
|   |   | $P_3$ $-5.5003$ |   |   |   |   |   |
|   |   | $P_4$ $-4.0534$ |   |   |   |   |   |
| 6 | ANAM | $R_y$ 72.293 | Y | 42.329 | $\theta$ | $-42.24°$ |
|   | (4TH SF) | $R_x$ 39.167 | Z | 43.924 |   |   |   |
|   |   | $K_y$ $-1.0213$ |   |   |   |   |   |
|   |   | $K_x$ $-7.8305$ |   |   |   |   |   |
|   |   | $R_1$ $-7.5404 \times 10^{-7}$ |   |   |   |   |   |
|   |   | $R_2$ $-5.8510 \times 10^{-10}$ |   |   |   |   |   |
|   |   | $R_3$ $5.8345 \times 10^{-13}$ |   |   |   |   |   |
|   |   | $R_4$ $1.5291 \times 10^{-15}$ |   |   |   |   |   |
|   |   | $P_1$ $-1.2077 \times 10^{-1}$ |   |   |   |   |   |
|   |   | $P_2$ $2.1174 \times 10^{-2}$ |   |   |   |   |   |
|   |   | $P_3$ $2.9220 \times 10^{-1}$ |   |   |   |   |   |
|   |   | $P_4$ $-1.4519$ |   |   |   |   |   |
| 7 |   | $\infty$ | Y | 42.878 | $\theta$ | $-19.36°$ |
|   | (Image display plane) |   | Z | 30.211 |   |   |   |
|   | (1) $\theta_{r3} = 42.75°$ |   |   |   |   |   |   |
|   | (3) $\phi_{t1}$ (yz) = 0.0008 (1/mm) |   |   |   |   |   |   |
|   | $\phi_{t1}$ (xz) = $-0.001$ (1/mm) |   |   |   |   |   |   |

Example 5

|   |   |   |   |   |   |   |   |
|---|---|---|---|---|---|---|---|
| 1 |   | $\infty$(Pupil) |   |   |   |   |   |
| 2 |   | $-104.851$ |   |   | 1.5254 |   | 56.25 |
|   | (1ST SF) |   | Y | 2.540 | $\theta$ | $-7.02°$ |
|   |   |   | Z | 33.527 |   |   |   |
| 3 | ANAM | $R_y$ $-54.751$ |   |   | 1.5254 |   | 56.25 |
|   | (2ND SF) | $R_x$ $-62.006$ | Y | $-19.747$ | $\theta$ | $-48.21°$ |
|   | (REFL) | $K_y$ $-1.3614$ | Z | 30.166 |   |   |   |
|   |   | $K_x$ 0.1944 |   |   |   |   |   |
|   |   | $R_1$ $2.4430 \times 10^{-10}$ |   |   |   |   |   |
|   |   | $R_2$ $-1.1189 \times 10^{-10}$ |   |   |   |   |   |
|   |   | $R_3$ $-2.4892 \times 10^{-16}$ |   |   |   |   |   |
|   |   | $R_4$ $1.9084 \times 10^{-22}$ |   |   |   |   |   |
|   |   | $P_1$ $-2.7674 \times 10^{+1}$ |   |   |   |   |   |
|   |   | $P_2$ $5.3845 \times 10^{-1}$ |   |   |   |   |   |
|   |   | $P_3$ $-4.1468$ |   |   |   |   |   |
|   |   | $P_4$ $1.0048 \times 10^{+1}$ |   |   |   |   |   |
| 4 |   | $-104.851$ |   |   | 1.5254 |   | 56.25 |
|   | (1ST SF) |   | Y | 2.540 | $\theta$ | $-7.02°$ |
|   | (REFL) |   | Z | 33.527 |   |   |   |
| 5 | ANAM | $R_y$ $-8201.935$ |   |   | 1.5254 |   | 56.25 |
|   | (3RD SF) | $R_x$ 1243.857 | Y | $-37.497$ | $\theta$ | 4.95° |
|   | (REFL) | $K_y$ 0.0000 | Z | 53.061 |   |   |   |
|   |   | $K_x$ 0.0000 |   |   |   |   |   |
|   |   | $R_1$ $9.7227 \times 10^{-8}$ |   |   |   |   |   |
|   |   | $R_2$ $1.2246 \times 10^{-12}$ |   |   |   |   |   |
|   |   | $R_3$ $-1.5956 \times 10^{-16}$ |   |   |   |   |   |
|   |   | $R_4$ $6.7677 \times 10^{-21}$ |   |   |   |   |   |
|   |   | $P_1$ $8.5858 \times 10^{-1}$ |   |   |   |   |   |
|   |   | $P_2$ $-4.4664$ |   |   |   |   |   |
|   |   | $P_3$ 1.9991 |   |   |   |   |   |
|   |   | $P_4$ 2.2019 |   |   |   |   |   |
| 6 |   | 46.674 | Y | 28.160 | $\theta$ | $-29.19°$ |
|   | (4TH SF) |   | Z | 36.643 |   |   |   |
| 7 |   | $\infty$ | Y | 31.793 | $\theta$ | $-26.09°$ |
|   | (Image display plane) |   | Z | 35.135 |   |   |   |
|   | (1) $\theta_{r3} = 36.51°$ |   |   |   |   |   |   |

-continued

Example 6

| | | | | | | | |
|---|---|---|---|---|---|---|---|
| 1 | | ∞(Pupil) | | | | | |
| 2 | | ∞ | | Y | 0.000 | θ | 20.00° |
| (Hypothetic plane) | | | | Z | 0.000 | | |
| 3 | | ∞ | | | 1.5254 | | 56.25 |
| (1ST SF) | | | | (from hypothetic plane) | | | |
| | | | | Y | 0.000 | θ | 0.00° |
| | | | | Z | 40.495 | | |
| 4 | ANAM | $R_y$ −146.661 | | | 1.5254 | | 56.25 |
| (2ND SF) | | $R_x$ −131.067 | | (from hypothetic plane) | | | |
| (REFL) | | $K_y$ −0.1158 | | Y | −23.006 | θ | −32.35° |
| | | $K_x$ −0.6570 | | Z | 49.040 | | |
| | | $R_1$ 1.4710 × 10$^{-8}$ | | | | | |
| | | $R_2$ 2.4181 × 10$^{-10}$ | | | | | |
| | | $R_3$ 8.0445 × 10$^{-14}$ | | | | | |
| | | $R_4$ −1.0655 × 10$^{-16}$ | | | | | |
| | | $P_1$ −6.7968 × 10$^{-1}$ | | | | | |
| | | $P_2$ 1.1524 × 10$^{-2}$ | | | | | |
| | | $P_3$ 9.6151 × 10$^{-1}$ | | | | | |
| | | $P_4$ 5.6260 × 10$^{-1}$ | | | | | |
| 5 | | ∞ | | | 1.5254 | | 56.25 |
| (1ST SF) | | | | (from hypothetic plane) | | | |
| (REFL) | | | | Y | 0.000 | θ | 0.00° |
| | | | | Z | 40.495 | | |
| 6 | | ∞ | | | 1.5254 | | 56.25 |
| (3RD SF) | | | | (from hypothetic plane) | | | |
| (REFL) | | | | Y | 0.000 | θ | 0.00° |
| | | | | Z | 56.475 | | |
| 7 | ANAM | $R_y$ 70.881 | | (from hypothetic plane) | | | |
| (4TH SF) | | $R_x$ 99.816 | | Y | 30.811 | θ | −80.98° |
| | | $K_y$ 6.0488 | | Z | 62.245 | | |
| | | $K_x$ 7.1389 | | | | | |
| | | $R_1$ 1.8385 × 10$^{-5}$ | | | | | |
| | | $R_2$ 1.8499 × 10$^{-10}$ | | | | | |
| | | $R_3$ −3.4116 × 10$^{-12}$ | | | | | |
| | | $R_4$ −7.2747 × 10$^{-15}$ | | | | | |
| | | $P_1$ 3.2623 × 10$^{-1}$ | | | | | |
| | | $P_2$ 3.8697 | | | | | |
| | | $P_3$ 9.0201 × 10$^{-1}$ | | | | | |
| | | $P_4$ 1.1638 × 10$^{-1}$ | | | | | |
| 8 | | ∞ | | Y | 40.634 | θ | −2.65° |
| (Image display plane) | | | | Z | 30.403 | | |
| (1) | $θ_{r3}$ = 46.70° | | | | | | |
| (3) | $φ_{t1}$ (yz) = 0 (1/mm) | | | | | | |
| | $φ_{t1}$ (xz) = 0 (1/mm) | | | | | | |

Example 9

| | | | | | | |
|---|---|---|---|---|---|---|
| 1 | ∞(Pupil) | | | | | |
| 2 | ∞ | | Y | 0.000 | θ | 15.00° |
| (Hypothetic plane) | | | Z | 0.000 | | |
| 3 | −221.433 | | | 1.5254 | | 56.25 |
| (1ST SF) | | | (from hypothetic plane) | | | |
| | | | Y | 0.000 | θ | 0.00° |
| | | | Z | 38.879 | | |
| 4 | −106.803 | | | 1.5254 | | 56.25 |
| (2ND SF) | | | (from hypothetic plane) | | | |
| (REFL) | | | Y | −16.310 | θ | −30.86° |
| | | | Z | 48.157 | | |
| 5 | −221.433 | | | 1.5254 | | 56.25 |
| (1ST SF) | | | (from hypothetic plane) | | | |
| (REFL) | | | Y | 0.000 | θ | 0.00° |
| | | | Z | 38.879 | | |
| 6 | −208.964 | | | 1.5254 | | 56.25 |
| (3RD SF) | | | (from hypothetic plane) | | | |
| (REFL) | | | Y | 0.000 | θ | 0.00° |
| | | | Z | 55.417 | | |
| 7 | 154.685 | | (from hypothetic plane) | | | |
| (4TH SF) | | | Y | 22.393 | θ | −20.71° |
| | | | Z | 41.581 | | |
| 8 | ∞ | | Y | 39.534 | θ | −5.00° |
| (Image display plane) | | | Z | 27.732 | | |
| (1) $θ_{r3}$ = 41.68° | | | | | | |
| (3) $φ_{t1}$ (yz) = 0.00024 (1/mm) | | | | | | |
| $φ_{t1}$ (xz) = 0.00024 (1/mm) | | | | | | |

-continued

Example 10

| | | | | | | | | |
|---|---|---|---|---|---|---|---|---|
| 1 | | ∞(Pupil) | | | | | | |
| 2 | | −104.851 | | | | 1.5254 | | 56.25 |
| | (1ST SF) | | | Y | 2.540 | | θ | −7.02° |
| | | | | Z | 33.527 | | | |
| 3 | ANAM | $R_y$ −54.751 | | Y | −19.747 | | θ | −48.21° |
| | (2ND SF) | $R_x$ −62.006 | | Z | 30.167 | | | |
| | (REFL) | $K_y$ −1.3614 | | | | | | |
| | | $K_x$ 0.1944 | | | | | | |
| | | $R_1$ 2.4430 × 10$^{-10}$ | | | | | | |
| | | $R_2$ −1.1189 × 10$^{-10}$ | | | | | | |
| | | $R_3$ −2.4892 × 10$^{-16}$ | | | | | | |
| | | $R_4$ 1.9084 × 10$^{-22}$ | | | | | | |
| | | $P_1$ −2.7674 × 10$^{+1}$ | | | | | | |
| | | $P_2$ 5.3845 × 10$^{-1}$ | | | | | | |
| | | $P_3$ −4.1468 | | | | | | |
| | | $P_4$ 1.0048 × 10$^{+1}$ | | | | | | |
| 4 | | ∞ | 2.000 | | | 1.4922 | | 57.50 |
| | (Fresnel-lens's first surface) | | | Y | 45.000 | | θ | 0.00° |
| | | | | Z | 51.527 | | | |
| 5 | | ∞ | | | | | | |
| | (Fresnel-lens's second surface) | | | | | | | |
| | | K 0.0000 | | | | | | |
| | | A 2.0658 × 10$^{-6}$ | | | | | | |
| | | B −4.2780 × 10$^{-10}$ | | | | | | |
| | | C 3.2196 × 10$^{-14}$ | | | | | | |
| | | D 2.1256 × 10$^{-18}$ | | | | | | |

Example 11

| | | | | | | | | |
|---|---|---|---|---|---|---|---|---|
| 1 | | ∞(Pupil) | | | | | | |
| 2 | | −104.851 | | | | 1.5254 | | 56.25 |
| | (1ST SF) | | | Y | 2.540 | | θ | −7.02° |
| | | | | Z | 33.527 | | | |
| 3 | ANAM | $R_y$ −54.751 | | Y | −19.747 | | θ | −48.21° |
| | (2ND SF) | $R_x$ −62.006 | | Z | 30.166 | | | |
| | (REFL) | $K_y$ −1.3614 | | | | | | |
| | | $K_x$ 0.1944 | | | | | | |
| | | $R_1$ 2.4430 × 10$^{-10}$ | | | | | | |
| | | $R_2$ −1.1189 × 10$^{-10}$ | | | | | | |
| | | $R_3$ −2.4892 × 10$^{-16}$ | | | | | | |
| | | $R_4$ 1.9084 × 10$^{-22}$ | | | | | | |
| | | $P_1$ −2.7674 × 10$^{+1}$ | | | | | | |
| | | $P_2$ 5.3845 × 10$^{-1}$ | | | | | | |
| | | $P_3$ −4.1468 | | | | | | |
| | | $P_4$ 1.0048 × 10$^{+1}$ | | | | | | |
| 4 | | ∞ | 2.000 | | | 1.4922 | | 57.50 |
| | (Fresnel-lens's first surface) | | | Y | 20.000 | | θ | −22.00° |
| | | | | Z | 53.527 | | | |
| 5 | | ∞ | | | | | | |
| | (Fresnel-lens's second surface) | | | | | | | |
| | | K 0.0000 | | | | | | |
| | | A 4.4111 × 10$^{-5}$ | | | | | | |
| | | B −1.0534 × 10$^{-7}$ | | | | | | |
| | | C 1.1649 × 10$^{-10}$ | | | | | | |
| | | D −4.9416 × 10$^{-14}$ | | | | | | |

Example 12 (1)

| | | | | | | | |
|---|---|---|---|---|---|---|---|
| 1 | ∞(Pupil) | | | | | | |
| 2 | Three-dimensional surface(1) | | | | 1.5254 | | 56.25 |
| | (1ST SF) | | Y | 13.983 | | θ | 9.46° |
| | | | Z | 33.974 | | | |
| 3 | Three-dimensional surface(2) | | | | 1.5254 | | 56.25 |
| | (2ND SF) | | Y | 4.596 | | θ | −15.22° |
| | (REFL) | | Z | 49.231 | | | |
| 4 | Three-dimensional surface(1) | | | | 1.5254 | | 56.25 |
| | (1ST SF) | | Y | 13.983 | | θ | 9.46° |
| | (REFL) | | Z | 33.974 | | | |
| 5 | Three-dimensional surface(3) | | Y | 27.094 | | θ | 79.39° |
| | (3RD SF) | | Z | 35.215 | | | |
| 6 | ∞ | | Y | 29.266 | | θ | 46.34° |
| | (Image display plane) | | Z | 46.318 | | | |

Three-dimensional surface(1)

| | | | | | |
|---|---|---|---|---|---|
| $C_5$ −2.6152 × 10$^{-3}$ | | $C_7$ −3.9706 × 10$^{-3}$ | | $C_8$ −7.5434 × 10$^{-5}$ | |
| $C_{10}$ −1.5120 × 10$^{-6}$ | | $C_{12}$ 2.6572 × 10$^{-7}$ | | $C_{14}$ 1.3359 × 10$^{-6}$ | |
| $C_{16}$ 1.7946 × 10$^{-7}$ | | $C_{17}$ −2.9881 × 10$^{-9}$ | | $C_{19}$ −3.0362 × 10$^{-9}$ | |
| $C_{21}$ −2.0258 × 10$^{-7}$ | | $C_{23}$ −3.8978 × 10$^{-10}$ | | $C_{25}$ 1.4986 × 10$^{-9}$ | |

-continued

| | | |
|---|---|---|
| $C_{27}$   $-3.8974 \times 10^{-9}$ | $C_{29}$   $-2.5335 \times 10^{-9}$ | $C_{30}$   $4.3101 \times 10^{-12}$ |
| $C_{32}$   $-1.4923 \times 10^{-11}$ | $C_{34}$   $7.6026 \times 10^{-11}$ | $C_{36}$   $-4.2410 \times 10^{-11}$ |

Three-dimensional surface(2)

| | | |
|---|---|---|
| $C_5$   $-6.2524 \times 10^{-3}$ | $C_7$   $-7.5944 \times 10^{-3}$ | $C_8$   $-1.0605 \times 10^{-5}$ |
| $C_{10}$   $9.3276 \times 10^{-6}$ | $C_{12}$   $8.3882 \times 10^{-7}$ | $C_{14}$   $-5.6861 \times 10^{-7}$ |
| $C_{16}$   $-4.9904 \times 10^{-7}$ | $C_{17}$   $-2.0403 \times 10^{-10}$ | $C_{19}$   $-8.0184 \times 10^{-9}$ |
| $C_{21}$   $-4.4196 \times 10^{-8}$ | $C_{23}$   $4.4149 \times 10^{-10}$ | $C_{25}$   $3.8170 \times 10^{-10}$ |
| $C_{27}$   $8.4970 \times 10^{-11}$ | $C_{29}$   $-2.8006 \times 10^{-10}$ | $C_{30}$   $1.3964 \times 10^{-12}$ |
| $C_{32}$   $-1.7677 \times 10^{-10}$ | $C_{34}$   $3.3220 \times 10^{-12}$ | $C_{36}$   $6.9401 \times 10^{-12}$ |

Three-dimensional surface(3)

| | | |
|---|---|---|
| $C_5$   $-1.2118 \times 10^{-2}$ | $C_7$   $-3.7062 \times 10^{-3}$ | $C_8$   $-1.2290 \times 10^{-4}$ |
| $C_{10}$   $9.9763 \times 10^{-4}$ | $C_{12}$   $-8.0746 \times 10^{-5}$ | $C_{14}$   $-3.8939 \times 10^{-5}$ |
| $C_{16}$   $2.6861 \times 10^{-5}$ | $C_{17}$   $-1.7720 \times 10^{-6}$ | $C_{19}$   $-3.4243 \times 10^{-6}$ |
| $C_{21}$   $-3.5310 \times 10^{-7}$ | $C_{23}$   $1.2185 \times 10^{-7}$ | $C_{25}$   $1.0019 \times 10^{-7}$ |
| $C_{27}$   $1.4838 \times 10^{-7}$ | $C_{29}$   $-5.3531 \times 10^{-8}$ | |

Example 12 (2)

| | | | | | |
|---|---|---|---|---|---|
| 1 | ∞(Pupil) | | | | |
| 2 | Three-dimensional surface(1) | | | 1.5254 | 56.25 |
| | (1ST SF) | Y | 13.983 | θ | 9.46° |
| | | Z | 33.974 | | |
| 3 | Three-dimensional surface(2) | | | 4.596 | −15.22° |
| | (2ND SF) | Y | 4.596 | θ | −15.22° |
| | | Z | 49.231 | | |
| 4 | ∞ | | 2.000 | 1.4922 | 57.50 |
| (Fresnel-lens's first surface) | | Y | 45.982 | θ | −18.17° |
| | | Z | 65.000 | | |
| 5 | ∞ | | | | |
| (Fresnel-lens's second surface) | | | | | |
| | K   0.0000 | | | | |
| | A   $3.9372 \times 10^{-6}$ | | | | |
| | B   $-1.6979 \times 10^{-9}$ | | | | |
| | C   $4.2377 \times 10^{-13}$ | | | | |
| | D   $-4.1829 \times 10^{-17}$ | | | | |

Three-dimensional surface(1)

| | | |
|---|---|---|
| $C_5$   $-2.6152 \times 10^{-3}$ | $C_7$   $-3.9706 \times 10^{-3}$ | $C_8$   $-7.5434 \times 10^{-5}$ |
| $C_{10}$   $-1.5120 \times 10^{-6}$ | $C_{12}$   $2.6572 \times 10^{-7}$ | $C_{14}$   $1.3359 \times 10^{-6}$ |
| $C_{16}$   $1.7946 \times 10^{-7}$ | $C_{17}$   $-2.9881 \times 10^{-9}$ | $C_{19}$   $-3.0362 \times 10^{-9}$ |
| $C_{21}$   $-2.0258 \times 10^{-7}$ | $C_{23}$   $-3.8978 \times 10^{-10}$ | $C_{25}$   $1.4986 \times 10^{-9}$ |
| $C_{27}$   $-3.8974 \times 10^{-9}$ | $C_{29}$   $-2.5335 \times 10^{-9}$ | $C_{30}$   $4.3101 \times 10^{-12}$ |
| $C_{32}$   $-1.4923 \times 10^{-11}$ | $C_{34}$   $7.6026 \times 10^{-11}$ | $C_{36}$   $-4.2410 \times 10^{-11}$ |

Three-dimensional surface(2)

| | | |
|---|---|---|
| $C_5$   $-6.2524 \times 10^{-3}$ | $C_7$   $-7.5944 \times 10^{-3}$ | $C_8$   $-1.0605 \times 10^{-5}$ |
| $C_{10}$   $9.3276 \times 10^{-6}$ | $C_{12}$   $8.3882 \times 10^{-7}$ | $C_{14}$   $-5.6861 \times 10^{-7}$ |
| $C_{16}$   $-4.9904 \times 10^{-7}$ | $C_{17}$   $-2.0403 \times 10^{-10}$ | $C_{19}$   $-8.0184 \times 10^{-9}$ |
| $C_{21}$   $-4.4196 \times 10^{-8}$ | $C_{23}$   $4.4149 \times 10^{-10}$ | $C_{25}$   $3.8170 \times 10^{-10}$ |
| $C_{27}$   $8.4970 \times 10^{-11}$ | $C_{29}$   $-2.8006 \times 10^{-10}$ | $C_{30}$   $1.3964 \times 10^{-12}$ |
| $C_{32}$   $-1.7677 \times 10^{-10}$ | $C_{34}$   $3.3220 \times 10^{-12}$ | $C_{36}$   $6.9401 \times 10^{-12}$ |

Example 13

| | | | | | |
|---|---|---|---|---|---|
| 1 | ∞(Pupil) | | | | |
| 2 | Three-dimensional surface(1) | | | 1.5163 | 64.15 |
| | (1ST SF) | Y | 0.000 | θ | 24.79° |
| | | Z | 35.567 | | |
| 3 | Three-dimensional surface(2) | | | 1.5163 | 64.15 |
| | (2ND SF) | Y | 5.402 | θ | −9.11° |
| | (REFL) | Z | 70.723 | | |
| 4 | Three-dimensional surface(3) | Y | 21.138 | θ | −25.12° |
| | (3RD SF) | Z | 39.783 | | |
| 5 | ∞ | Y | 23.963 | θ | −11.11° |
| (Image display plane) | | Z | 34.441 | | |

Three-dimensional surface(1)

| | | |
|---|---|---|
| $C_5$   $6.8620 \times 10^{-3}$ | $C_7$   $7.4153 \times 10^{-3}$ | $C_8$   $5.9417 \times 10^{-5}$ |
| $C_{10}$   $2.9033 \times 10^{-5}$ | $C_{12}$   $-4.6823 \times 10^{-7}$ | $C_{14}$   $3.8805 \times 10^{-6}$ |
| $C_{16}$   $5.0284 \times 10^{-7}$ | $C_{17}$   $2.3906 \times 10^{-8}$ | $C_{19}$   $7.1030 \times 10^{-8}$ |
| $C_{21}$   $2.8323 \times 10^{-8}$ | | |

Three-dimensional surface(2)

| | | |
|---|---|---|
| $C_5$   $-3.7101 \times 10^{-3}$ | $C_7$   $-4.1036 \times 10^{-3}$ | $C_8$   $4.2896 \times 10^{-6}$ |
| $C_{10}$   $-8.4314 \times 10^{-6}$ | $C_{12}$   $-8.1477 \times 10^{-8}$ | $C_{14}$   $1.1846 \times 10^{-6}$ |
| $C_{16}$   $2.8608 \times 10^{-7}$ | $C_{17}$   $8.8332 \times 10^{-9}$ | $C_{19}$   $3.2284 \times 10^{-8}$ |
| $C_{21}$   $1.2745 \times 10^{-8}$ | | |

-continued

Three-dimensional surface(3)

| $C_5$ | $1.5613 \times 10^{-2}$ | $C_7$ | $1.5901 \times 10^{-2}$ | $C_8$ | $3.8223 \times 10^{-4}$ |
|---|---|---|---|---|---|
| $C_{10}$ | $-5.9546 \times 10^{-5}$ | $C_{12}$ | $-5.8106 \times 10^{-5}$ | $C_{14}$ | $-4.2859 \times 10^{-5}$ |
| $C_{16}$ | $-2.2163 \times 10^{-5}$ | $C_{17}$ | $1.1940 \times 10^{-6}$ | $C_{19}$ | $2.0760 \times 10^{-6}$ |
| $C_{21}$ | $1.0626 \times 10^{-6}$ | | | | |

Example 14

| 1 | ∞(Pupil) | | | | |
|---|---|---|---|---|---|
| 2 | Three-dimensional surface(1) | | 1.5163 | | 64.15 |
| | (1ST SF) | Y | −10.123 | θ | 20.33° |
| | | Z | 43.489 | | |
| 3 | Three-dimensional surface(2) | | 1.5163 | | 64.15 |
| | (2ND SF) | Y | 1.103 | θ | −10.31° |
| | (REFL) | Z | 65.000 | | |
| 4 | Three-dimensional surface(1) | | | | |
| | (1ST SF) | Y | −10.123 | θ | 20.33° |
| | | Z | 43.489 | | |
| 5 | ∞ | Y | 17.608 | θ | −13.99° |
| | (Image display plane) | Z | 30.846 | | |

Three-dimensional surface(1)

| $C_5$ | $1.0401 \times 10^{-2}$ | $C_7$ | $8.6572 \times 10^{-3}$ | $C_8$ | $9.8267 \times 10^{-5}$ |
|---|---|---|---|---|---|
| $C_{10}$ | $2.0456 \times 10^{-4}$ | $C_{12}$ | $-9.4226 \times 10^{-6}$ | $C_{14}$ | $1.6262 \times 10^{-6}$ |
| $C_{16}$ | $4.0506 \times 10^{-6}$ | $C_{17}$ | $3.2669 \times 10^{-7}$ | $C_{19}$ | $2.1072 \times 10^{-7}$ |
| $C_{21}$ | $1.5355 \times 10^{-7}$ | | | | |

Three-dimensional surface(2)

| $C_5$ | $-2.5798 \times 10^{-3}$ | $C_7$ | $-3.0708 \times 10^{-3}$ | $C_8$ | $-3.2024 \times 10^{-5}$ |
|---|---|---|---|---|---|
| $C_{10}$ | $-3.3909 \times 10^{-6}$ | $C_{12}$ | $2.9430 \times 10^{-6}$ | $C_{14}$ | $4.3427 \times 10^{-6}$ |
| $C_{16}$ | $3.4981 \times 10^{-6}$ | $C_{17}$ | $-2.8763 \times 10^{-8}$ | $C_{19}$ | $4.0895 \times 10^{-8}$ |
| $C_{21}$ | $5.4666 \times 10^{-8}$ | | | | |

Example 17

| 1 | ∞(Pupil) | | | | |
|---|---|---|---|---|---|
| 2 | Three-dimensional surface(1) | | 1.5000 | | 55.55 |
| | (1ST SF) | Y | 18.958 | θ | 7.69° |
| | | Z | 30.730 | | |
| 3 | Three-dimensional surface(2) | | 1.5000 | | 55.55 |
| | (2ND SF) | Y | 9.165 | θ | −13.84° |
| | (REFL) | Z | 48.107 | | |
| 4 | Three-dimensional surface(1) | | 1.5000 | | 55.55 |
| | (1ST SF) | Y | 18.958 | θ | 7.69° |
| | (REFL) | Z | 30.730 | | |
| 5 | Three-dimensional surface(2) | | 1.5000 | | 55.55 |
| | (2ND SF) | Y | 9.165 | θ | −13.84° |
| | (REFL) | Z | 48.107 | | |
| 6 | Three-dimensional surface(3) | | 1.5000 | | 55.55 |
| | (4TH SF) | Y | 34.128 | θ | −31.50° |
| | | Z | 30.758 | | |
| 7 | ∞ | Y | 47.350 | θ | −34.92° |
| | (Image display plane) | Z | 35.893 | | |

Three-dimensional surface(1)

| $C_5$ | $-4.9463 \times 10^{-3}$ | $C_7$ | $-3.4912 \times 10^{-3}$ | $C_8$ | $6.9477 \times 10^{-5}$ |
|---|---|---|---|---|---|
| $C_{10}$ | $1.7114 \times 10^{-4}$ | $C_{12}$ | $1.0830 \times 10^{-6}$ | $C_{14}$ | $-2.2541 \times 10^{-7}$ |
| $C_{16}$ | $4.5743 \times 10^{-6}$ | $C_{17}$ | $6.1581 \times 10^{-8}$ | $C_{19}$ | $4.7667 \times 10^{-8}$ |
| $C_{21}$ | $-1.9359 \times 10^{-7}$ | $C_{23}$ | $-1.3103 \times 10^{-10}$ | $C_{25}$ | $-7.7572 \times 10^{-10}$ |
| $C_{27}$ | $7.0783 \times 10^{-10}$ | $C_{29}$ | $5.3774 \times 10^{-9}$ | $C_{30}$ | $4.7726 \times 10^{-12}$ |
| $C_{32}$ | $1.3699 \times 10^{-11}$ | $C_{34}$ | $7.4217 \times 10^{-11}$ | $C_{36}$ | $-1.3460 \times 10^{-10}$ |

Three-dimensional surface(2)

| $C_5$ | $-5.9243 \times 10^{-3}$ | $C_7$ | $-5.4509 \times 10^{-3}$ | $C_8$ | $3.4016 \times 10^{-5}$ |
|---|---|---|---|---|---|
| $C_{10}$ | $7.9633 \times 10^{-5}$ | $C_{12}$ | $-4.1470 \times 10^{-7}$ | $C_{14}$ | $1.0233 \times 10^{-6}$ |
| $C_{16}$ | $2.6471 \times 10^{-6}$ | $C_{17}$ | $2.3016 \times 10^{-9}$ | $C_{19}$ | $3.3134 \times 10^{-8}$ |
| $C_{21}$ | $-1.6456 \times 10^{-8}$ | $C_{23}$ | $-1.3255 \times 10^{-10}$ | $C_{25}$ | $-4.9215 \times 10^{-10}$ |
| $C_{27}$ | $-3.3070 \times 10^{-10}$ | $C_{29}$ | $4.1802 \times 10^{-9}$ | | |

Three-dimensional surface(3)

| $C_5$ | $7.9798 \times 10^{-3}$ | $C_7$ | $1.7546 \times 10^{-2}$ | $C_8$ | $-1.1020 \times 10^{-4}$ |
|---|---|---|---|---|---|
| $C_{10}$ | $9.4392 \times 10^{-4}$ | $C_{12}$ | $-3.9282 \times 10^{-6}$ | $C_{14}$ | $-7.3326 \times 10^{-6}$ |
| $C_{16}$ | $-1.4273 \times 10^{-5}$ | | | | |

(1) $\theta_{t3} = 46.48°$

Although in the above-described examples the optical systems are constructed by using aspherical surfaces, anamorphic surfaces and three-dimensional surfaces defined by the above equations (a), (b) and (c), it is also possible to use surface configurations expressed by Zernike polynomials as defined by the following equation (d) and three-dimensional surfaces symmetric with respect to the X-axis direction as defined by the following equation (e). That is, curved surfaces expressed by any defining equations can be used.

Plane-symmetry three-dimensional surfaces may also be defined by Zernike polynomials. That is, the configuration of a plane-symmetry three-dimensional surface may be defined by the following equation (d). The Z-axis of the defining equation (d) is the axis of Zernike polynomial.

$X = Rx \cos(A)$ $Y = Rx \sin(A)$ $$Z = D_2 + \qquad (d)$$
$$D_3 R \cos(A) + D_4 R \sin(A) +$$
$$D_5 R^2 \cos(2A) + D_6 (R^2 - 1) + D_7 R^2 \sin(2A) +$$
$$D_8 R^3 \cos(3A) + D_9 (3R^3 - 2R) \cos(A) +$$
$$D_{10}(3R^3 - 2R)\sin(A) + D_{11} R^3 \sin(3A) +$$
$$D_{12} R^4 \cos(4A) + D_{13}(4R^4 - 3R^2)\cos(2A) +$$
$$D_{14}(6R^4 - 6R^2 + 1) + D_{15}(4R^4 - 3R^2)\sin(2A) +$$
$$D_{16} R^4 \sin(4A) + D_{17} R^5 \cos(5A) +$$
$$D_{18}(5R^5 - 4R^3)\cos(3A) +$$
$$D_{19}(10R^5 - 12R^3 + 3R)\cos(A) +$$
$$D_{20}(10R^5 - 12R^3 + 3R)\sin(A) +$$
$$D_{21}(5R^5 - 4R^3)\sin(3A) + D_{22} R^5 \sin(5A) +$$
$$D_{23} R^6 \cos(6A) + D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) +$$
$$D_{28}(6R^6 - 5R^4)\sin(4A) + D_{29} R^6 \sin(6A)$$

It should be noted that the plane-symmetry three-dimensional surface in the above equation is expressed as a surface which is symmetric with respect to the X-axis direction. In the above equation, $D_m$(m is an integer of 2 or higher) are coefficients.

A three-dimensional surface symmetric with respect to the X-axis direction may be defined in correspondence to the above equation (c) as follows:

$$Z = C_2 + C_3 Y + C_4 |X| + C_5 Y^2 + C_6 Y|X| + C_7 X^2 + \qquad (e)$$
$$C_8 Y^3 + C_9 Y^2 |X| + C_{10} YX^2 + C_{11} |X^3| + C_{12} Y^4 +$$
$$C_{13} Y^3 |X| + C_{14} Y^2 X^2 + C_{15} Y|X^3| + C_{16} X^4 + C_{17} Y^5 +$$
$$C_{18} Y^4 |X| + C_{19} Y^3 X^2 + C_{20} Y^2 |X^3| + C_{21} YX^4 + C_{22} |X^5| +$$
$$C_{23} Y^6 + C_{24} Y^5 |X| + C_{25} Y^4 X^2 + C_{26} Y^3 |X^3| + C_{27} Y^2 X^4 +$$
$$C_{28} Y|X^5| + C_{29} X^6 + C_{30} Y^7 + C_{31} Y^6 |X| C_{32} Y^5 X^2 +$$
$$C_{33} Y^4 |X^3| + C_{34} Y^3 X^4 + C_{35} Y^2 |X^5| + C_{36} YX^6 + C_{37} |X^7|$$

Incidentally, it is possible to construct an image display apparatus for a single eye by preparing a combination of an ocular optical system arranged as described above and an image display device. Alternatively, it is possible to construct an image display apparatus for both eyes by preparing a pair of combinations of an ocular optical system arranged as described above and an image display device for the left and right eyes, and supporting them apart from each other by the interpupillary distance, i.e. the distance between the two eyes. In this way, it is possible to form a stationary or portable image display apparatus which enables the observer to see with a single eye or both eyes.

Figure 21:
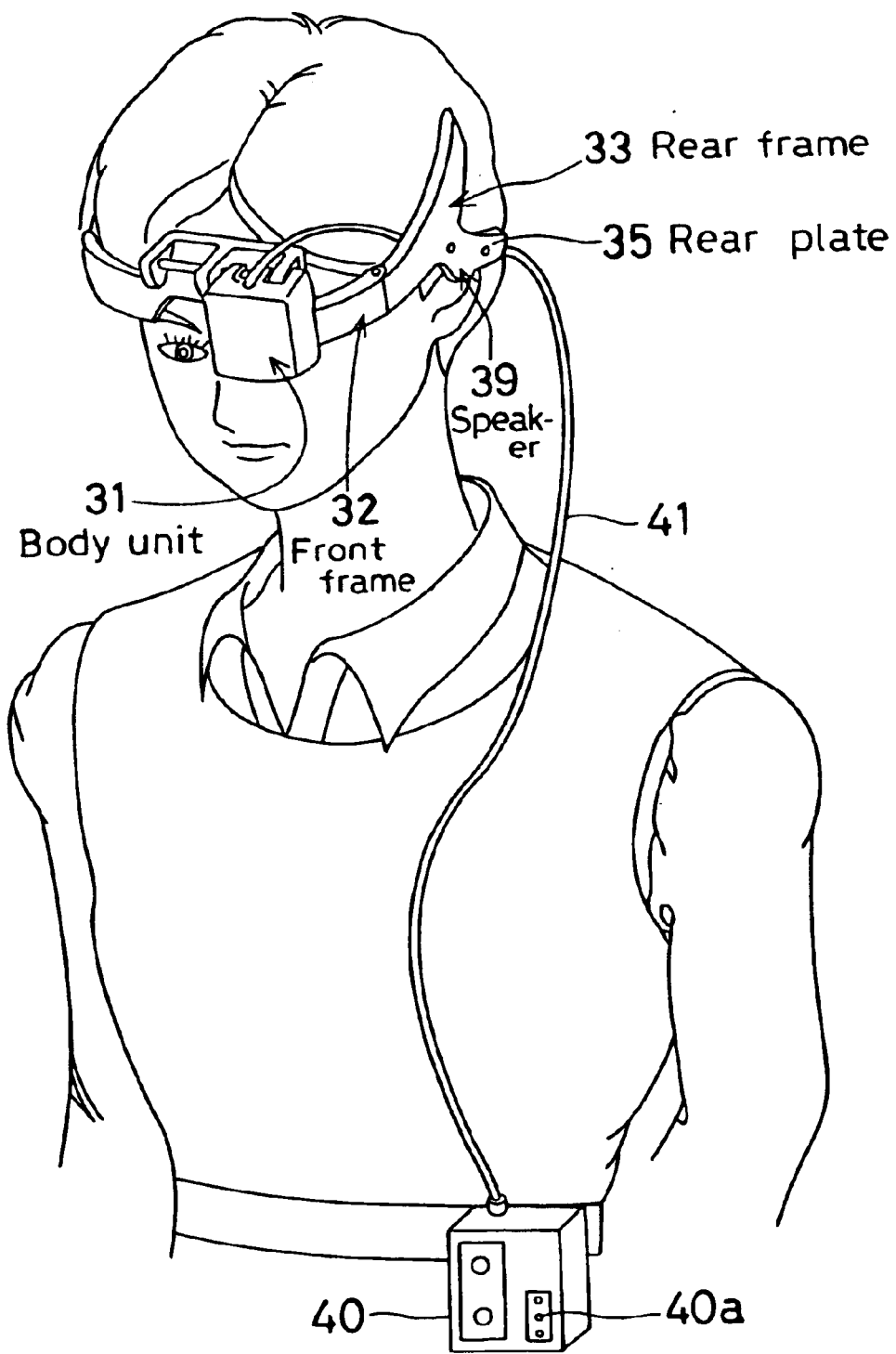
FIG. 21 shows an image display apparatus according to the present invention which is arranged in the form of an image display apparatus for a single eye.
Figure 22:
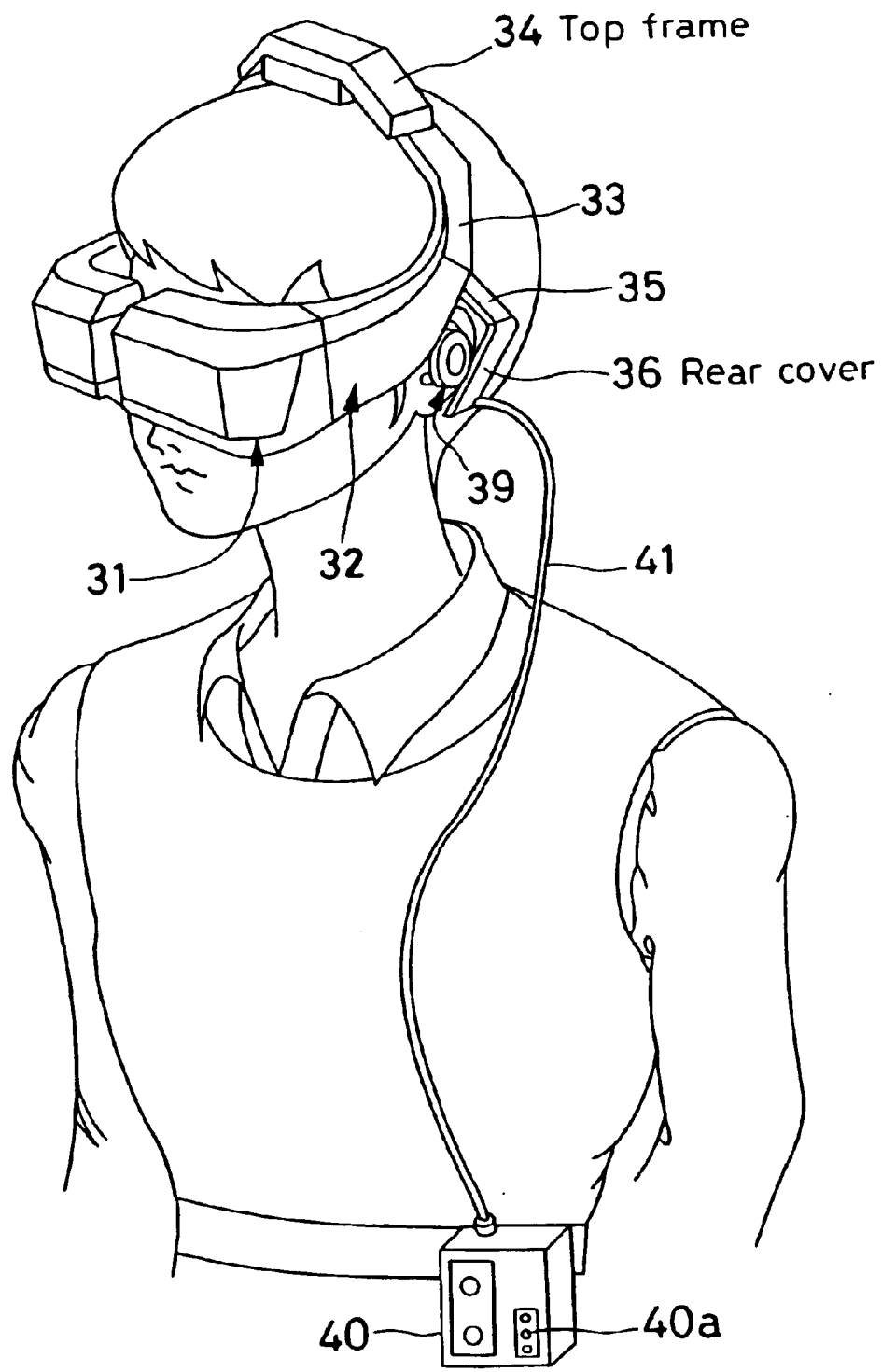
FIG. 22 shows an image display apparatus according to the present invention which is arranged in the form of an image display apparatus for both eyes.

FIG. 21 shows an image display apparatus designed for a single eye(in this case, the apparatus is designed for the left eye), and FIG. 22 shows an image display apparatus designed for both eyes. In FIGS. 21 and 22, reference numeral 31 denotes a display apparatus body unit. In the case of FIG. 21, the display apparatus body unit 31 is supported by a support member through the observer's head such that the display apparatus body unit 31 is held in front of the observer's left eye. In the case of FIG. 22, the display apparatus body unit 31 is supported by a support member through the observer's head such that the display apparatus body unit 31 is held in front of both the observer's eyes. The support member has a pair of left and right front frames 32 each joined at one end thereof to the display apparatus body unit 31. The left and right front frames 32 extend from the observer's temples to the upper portions of his/her ears, respectively. A pair of left and right rear frames 33 are joined to the other ends of the left and right front frames 32, respectively, and extend over the left and right side portions of the observer's head. In the case of FIG. 22, the support member further has a top frame 34 joined at both ends thereof to the other ends of the left and right rear frames 33, respectively, such that the top frame 34 supports the top of the observer's head.

A rear plate 35 is joined to one front frame 32 near the joint to the rear frame 33. The rear plate 35 is formed from an elastic member, e.g. a metal leaf spring. In the case of FIG. 22, a rear cover 36, which constitutes a part of the support member, is joined to the rear plate 35 such that the rear cover 36 can support the apparatus at a position behind the observer's ear in a region extending from the back part of the head to the base of the neck. A speaker 39 is mounted inside the rear plate 35 or the rear cover 36 at a position corresponding to the observer's ear.

A cable 41 for transmitting external image and sound signals is led out from the display apparatus body unit 31. In the case of FIG. 22, the cable 41 extends through the top frame 34, the rear frames 33, the front frames 32 and the rear plate 35 and projects to the outside from the rear end of the rear cover 36. In the case of FIG. 21, the cable 41 projects from the rear end of the rear plate 35. The cable 41 is connected to a video reproducing unit 40. It should be noted that reference numeral 40a denotes a switch and volume control part of the video reproducing unit 40.

The cable 41 may have a jack and plug arrangement attached to the distal end thereof so that the cable 41 can be detachably connected to an existing video deck. The cable 41 may also be connected to a TV signal receiving tuner so as to enable the user to enjoy watching TV. Alternatively, the cable 41 may be connected to a computer to receive computer graphic images or message images or the like from the computer. To eliminate the bothersome cord, the image display apparatus may be arranged to receive external radio signals through an antenna connected thereto.

Figure 23:
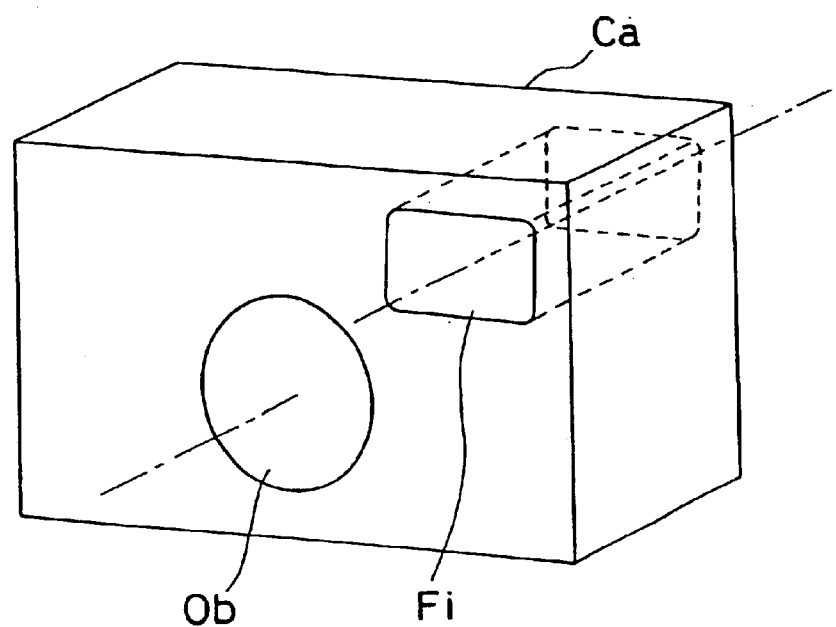
FIG. 23 shows an arrangement of an optical system according to the present invention which is used as an image-forming optical system.
Figure 24:
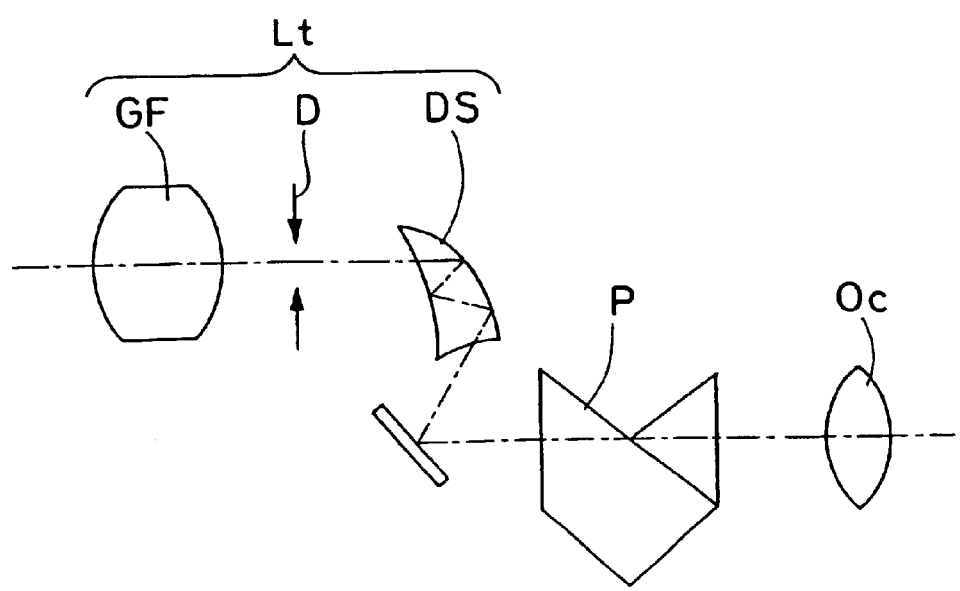
FIG. 24 shows an arrangement of an optical system according to the present invention which is used as an image-forming optical system.

Further, the ocular optical system of the image display apparatus according to the present invention can be used as an image-forming optical system. For example, as shown in FIG. 23, the ocular optical system may be used in a finder optical system $F_i$ of a compact camera $C_a$ in which a photographic optical system $O_b$ and the finder optical system $F_i$ are provided separately in parallel to each other. FIG. 24 shows the arrangement of an optical system in a case where the ocular optical system according to the present invention is used as such an image-forming optical system. As illustrated, the ocular optical system DS according to the present invention is disposed behind a front lens group GF and an aperture diaphragm D, thereby constituting an objective optical system $L_r$. An image that is formed by the objective optical system $L_r$ is erected by a Porro prism P, in which there are four reflections, provided at the observer side of the objective optical system $L_r$, thereby enabling an erect image to be observed through an ocular lens $O_c$.

Although the prism optical element, image observation apparatus and image display apparatus according to the present invention have been described above by way of some examples, it should be noted that the present invention is not necessarily limited to these examples, and that various modifications may be imparted thereto without departing from the scope of the present invention.

As will be clear from the foregoing description, the present invention makes it possible to provide an image display apparatus usable as an image observation apparatus which has an extremely thin and compact ocular optical system and yet suffers from minimal unwanted light and provides an observation image that is clear even at a wide observation field angle.

What we claim is:

1. An image observation apparatus comprising image forming means and an ocular optical system having an action by which an image formed by said image forming means is led to an eyeball of an observer, wherein said ocular optical system includes at least a prism member, said prism member having at least four optical surfaces having a transmitting or reflecting optical action, wherein a space surrounded by said at least four optical surfaces is filled with a single medium having a refractive index (n) larger than 1 (n>1), said at least four optical surfaces including a first surface having both a transmitting action and a reflecting action and disposed on a side of said prism member that is closer to said observer's eyeball; a second surface having a reflecting action and disposed to face said first surface across said medium, said second surface being at least decentered or tilted with respect to an observer's visual axis; a third surface having a reflecting action and disposed to face said first surface across said medium at a position substantially adjacent to said second surface; and a fourth surface disposed such that one end thereof is substantially adjacent to said first surface, and the other end thereof is substantially close to said third surface, wherein at least said third surface has a totally reflecting action, and said first surface, said single medium and said third surface are arranged to have an external-scene observation action by which an external scene can be observed through said first surface, said single medium and said third surface, and wherein the first surface is identical in surface shape with the third surface.

2. An image observation apparatus according to claim 1, wherein said image forming means is an image display device having an image forming surface disposed to face said fourth surface, and said second surface is formed from a curved surface.

3. A head-mounted image display apparatus comprising:
the image observation apparatus of claim 2; and
a retaining member that retains both said image display device and said ocular optical system in front of the observer's eyeball,
wherein said prism member is arranged such that a bundle of light rays emitted from said image display device enters said prism member through said fourth surface, and the light rays are reflected successively by said third surface, said first surface and said second surface so as to exit from said first surface.

4. An image observation apparatus according to any one of claims 1 to 3, wherein said external-scene observation action is formed such that a composite power of said first and third surfaces at at least one region of each of them is approximately zero.

5. An image observation apparatus according to any one of claims 1 to 3, wherein said first surface and said third surface are formed from curved surfaces, respectively.

6. An image observation apparatus according to any one of claims 1 to 3, wherein said first surface and said third surface are formed from spherical surfaces, respectively.

7. An image observation apparatus according to any one of claims 1 to 3, wherein said first surface and said third surface are planar shaped surfaces.

8. An image observation apparatus according to any one of claims 1 to 3, which satisfies the following condition:

$$-0.5 \leq \phi_{r1} \leq 0.5 \text{ (1/millimeter)} \quad (3)$$

where $\phi_{r1}$ is a composite power of said first and third surfaces at respective arbitrary regions thereof.

9. An image observation apparatus according to claim 1, wherein said prism member is fixed at a same position regardless of whether the observer views the image formed by said image forming means or an image of the external scene.

10. An image observation apparatus according to claim 9, wherein the image formed by said image forming means and the image of the external scene can be observed in respective partial regions through said first surface and said third surface.

11. An image observation apparatus according to any one of claims 1 to 3, wherein said prism member has switching means that causes observation modes to change between observation of the image formed by said image forming means and observation of an image of the external scene, said switching means having a function of moving said prism member.

12. An image observing apparatus according to any one of claim 11, wherein said switching means moves said prism member such that an optical path extending from said prism member to said observer's eyeball to observe the image formed by said image forming means is approximately coincident with an optical path extending from said prism member to said observer's eyeball to observe the image of the external scene.

13. An image observation apparatus according to claim 11, wherein said switching means causes said prism member to move along a plane containing an optical path of an axial principal ray.

14. An image observation apparatus according to claim 11, wherein said switching means causes said prism member to move in a direction perpendicular to the observer's visual axis.

15. An image observation apparatus according to claim 11, wherein said switching means causes said prism member to rotate.

16. An image observation apparatus according to claim 1, further comprising positioning means for positioning said image forming means and said ocular optical system with respect to an observer's head.

17. An image observation apparatus according to claim 1, further comprising support means for supporting at least a pair of said image observation apparatuses at a predetermined spacing.

18. An image observation apparatus comprising image forming means and an ocular optical system having an action by which an image formed by said image forming means is led to an eyeball of an observer, wherein said ocular optical system includes at least a prism member, said prism member having at least four optical surfaces having a transmitting or reflecting optical action, wherein a space surrounded by said at least four optical surfaces is filled with a single medium having a refractive index (n) larger than 1 (n>1), said at least four optical surfaces including a first surface having both a transmitting action and a reflecting action and disposed on a side of said prism member that is closer to said observer's eyeball; a second surface having a reflecting action and disposed to face said first surface across said medium, said second surface being at least decentered or tilted with respect to an observer's visual axis; a third surface having a reflecting action and disposed to face said first surface across said medium at a position substantially adjacent to said second surface; and a fourth surface disposed such that one end thereof is substantially adjacent to said first surface, and the other end thereof is substantially close to said third surface, wherein at least said third surface has a totally reflecting action, and said first surface, said single medium and said third surface are arranged to have an external-scene observation action by which an external scene can be observed through said first surface, said single medium and said third surface, and wherein the surface shape of the first surface, and the third surface is determined such that the external scene observed via the first surface and the third surface is the same as the external scene observed other than via the first surface and the third surfaces wherein the composite power of the power of said first surface plus the power of said third surface is substantially equal to zero.

* * * * *